(12) United States Patent
Kim et al.

(10) Patent No.: US 11,379,076 B2
(45) Date of Patent: Jul. 5, 2022

(54) TOUCH DISPLAY DEVICE, DATA DRIVING CIRCUIT, AND DRIVING METHOD FOR INDEPENDENTLY PERFORMING DISPLAY AND TOUCH SENSING

(71) Applicant: LG Display Co., Ltd., Seoul (KR)

(72) Inventors: HoonBae Kim, Seoul (KR); CheolSe Kim, Daegu (KR); SungChul Kim, Paju-si (KR); SunYeop Kim, Seoul (KR); Seongkyu Kang, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 17/224,597

(22) Filed: Apr. 7, 2021

(65) Prior Publication Data
US 2021/0223938 A1 Jul. 22, 2021

Related U.S. Application Data

(63) Continuation of application No. 16/439,366, filed on Jun. 12, 2019, now Pat. No. 10,996,791.

(30) Foreign Application Priority Data

Jun. 14, 2018 (KR) .......................... 10-2018-0068110

(51) Int. Cl.
*G06F 3/041* (2006.01)
*G06F 3/044* (2006.01)
(Continued)

(52) U.S. Cl.
CPC .......... *G06F 3/04166* (2019.05); *G06F 3/044* (2013.01); *G06F 3/04162* (2019.05);
(Continued)

(58) Field of Classification Search
CPC ...... G09G 3/20; G09G 3/3225; G09G 3/3648; G09G 3/3655; G09G 3/2092;
(Continued)

(56) References Cited

U.S. PATENT DOCUMENTS

2012/0113161 A1* 5/2012 Hong .................... H04N 13/337
345/690
2013/0127787 A1 5/2013 Kim et al.
(Continued)

FOREIGN PATENT DOCUMENTS

EP 3309662 A1 4/2018

OTHER PUBLICATIONS

Extended European Search Report, European Patent Application, No. 19179960.0, dated Aug. 9, 2019, fourteen pages.
(Continued)

*Primary Examiner* — Kwang-Su Yang
(74) *Attorney, Agent, or Firm* — Fenwick & West LLP

(57) ABSTRACT

A touch display device, a data driving circuit, and a driving method are provided. The touch display device, the data driving circuit, and the driving method convert an image digital signal into an image analog signal in response to a gamma reference voltage which is applied to the touch electrodes arranged in the display panel and which is modulated in synchronization with a first touch electrode driving signal swinging with a first amplitude and output a data signal corresponding to the converted image analog signal to the data lines. Accordingly, it is possible to effectively simultaneously perform display and touch sensing.

16 Claims, 26 Drawing Sheets

(51) Int. Cl.
*G09G 3/20* (2006.01)
*G09G 3/3266* (2016.01)
*G09G 3/3275* (2016.01)
*G09G 3/36* (2006.01)

(52) U.S. Cl.
CPC ......... *G09G 3/2092* (2013.01); *G09G 3/3266* (2013.01); *G09G 3/3275* (2013.01); *G09G 3/3614* (2013.01); *G09G 3/3677* (2013.01); *G09G 3/3688* (2013.01); *G09G 2310/027* (2013.01); *G09G 2310/0254* (2013.01); *G09G 2310/0291* (2013.01)

(58) Field of Classification Search
CPC ......... G09G 2310/0291; G09G 3/3688; G09G 2330/028; G09G 2310/0254; G09G 3/3677; G09G 3/3266; G09G 2310/027; G09G 2310/0297; G09G 2320/0673; G09G 3/3614; G09G 3/3275; G06F 3/0412; G06F 3/0418; G06F 3/04162; G06F 3/044; G06F 3/0443; G06F 3/04166; G06F 2203/04114
See application file for complete search history.

(56) References Cited

U.S. PATENT DOCUMENTS

2016/0092027 A1    3/2016  Lee et al.
2016/0329019 A1*  11/2016  An .......................... G09G 3/20
2018/0107315 A1    4/2018  Lee et al.

OTHER PUBLICATIONS

United States Office Action, U.S. Appl. No. 16/439,366, dated Sep. 30, 2020, sixteen pages.

* cited by examiner

FIG.8
TDS
(Case 1)   TDS1   
(Case 2)   TDS2   ──────────
(Case 3)   TDS3   

(Case 1)

(Case 2)

(Case 3)

Gamma Block (GMA)

TOUCH DISPLAY DEVICE, DATA DRIVING CIRCUIT, AND DRIVING METHOD FOR INDEPENDENTLY PERFORMING DISPLAY AND TOUCH SENSING

CROSS REFERENCE TO RELATED APPLICATION

This application is a continuation of U.S. patent application Ser. No. 16/439,366 filed on Jun. 12, 2019 which claims priority from Republic of Korea Patent Application No. 10-2018-0068110, filed on Jun. 14, 2018, each of which is hereby incorporated by reference in its entirety.

BACKGROUND

Field of Technology

The present disclosure relates to a touch display device, a data driving circuit, and a driving method.

Discussion of the Related Art

With advancement in information-oriented societies, requirements for touch display devices displaying an image have increased in various types, and various display devices such as a liquid crystal display device, a plasma display device, and an organic light emitting display device have been widely utilized.

Among such display devices, there is a touch display device that provides a touch-based input system enabling a user to easily, intuitively, and conveniently input information or commands instead of normal input systems using buttons, a keyboard, a mouse, and the like.

In a touch display device according to the related art, since both a display function (an image display function) and a touch sensing function have to be provided, display and touch sensing are alternately performed at divided time intervals.

In such a time-division driving system, considerably elaborate timing control is required for performing display driving and touch driving in a time-division manner, and components at high costs may be required.

In the time-division driving system, both a display driving time and a touch driving time may be insufficient and thus there is a problem in that image quality and touch sensitivity decrease. Particularly, there may be a problem in that image quality with a high resolution is not provided due to time-division driving.

In a touch display device, since there may be various driving environments, various driving timings for display driving and touch driving are required. However, the touch display device according to the related art has a problem in that it cannot provide various driving timings for display driving and touch driving.

SUMMARY

An objective of the present disclosure is to provide a touch display device, a data driving circuit, and a driving method that can independently perform display and touch sensing.

Another objective of the disclosure is to provide a touch display device, a data driving circuit, and a driving method that can effectively simultaneously perform display and touch sensing.

Another objective of the disclosure is to provide a touch display device, a data driving circuit, and a driving method that can simultaneously perform display and touch sensing and achieve excellent display and touch sensing performance by minimizing or removing interference between display driving and touch driving.

Another objective of the disclosure is to provide a touch display device, a data driving circuit, and a driving method that can operate to be adapted to various driving environments.

According to an aspect, embodiments of the disclosure provide a touch display device including: a display panel in which a plurality of data lines and a plurality of gate lines are arranged and a plurality of touch electrodes are arranged; a gate driving circuit that is able to be electrically connected to the plurality of gate lines and drives the plurality of gate lines; a data driving circuit that is able to be electrically connected to the plurality of data lines and drives the plurality of data lines; and a touch driving circuit that is able to be electrically connected to the plurality of touch electrodes and drives the plurality of touch electrodes.

The data driving circuit converts an image digital signal into an image analog signal in response to a gamma reference voltage which is modulated in synchronization with a first touch electrode driving signal which swings with a first amplitude and is applied to the touch electrodes arranged in the display panel, and outputs a data signal corresponding to the converted image analog signal to the data lines.

The converted gamma reference voltage may have a frequency and a phase corresponding to the frequency and the phase of the first touch electrode driving signal.

The converted gamma reference voltage may have an amplitude corresponding to the first amplitude of the first touch electrode driving signal.

The data signal may have a signal pattern in which first pulses having a first pulse width and second pulses having a second pulse width greater than the first pulse width are combined.

When a period of the first touch electrode driving signal is shorter than a predetermined horizontal time, the first pulses may include a part having an amplitude corresponding to a first amplitude of the first touch electrode driving signal and the first pulse width may correspond to a pulse width of the first touch electrode driving signal.

When the period of the first touch electrode driving signal is longer than the predetermined horizontal time, the second pulses may include a part having an amplitude corresponding to the first amplitude of the first touch electrode driving signal and the second pulse width may correspond to the pulse width of the first touch electrode driving signal.

The data driving circuit may include: a digital-analog converter that receives the image digital signal, receives a first gamma reference voltage, a second gamma reference voltage, a third gamma reference voltage, and a fourth gamma reference voltage having a frequency and a phase corresponding to the frequency and the phase of the first touch electrode driving signal, and converts the image digital signal into a first image analog signal in response to the first gamma reference voltage and the second gamma reference voltage or converts the image digital signal into a second image analog signal in response to the third gamma reference voltage and the fourth gamma reference voltage; a first output buffer circuit that receives the first image analog signal and outputs a first data signal to the data lines; and a second output buffer circuit that receives the second image analog signal and outputs a second data signal to the data lines.

The first gamma reference voltage may be set to a voltage higher than the second gamma reference voltage, the second gamma reference voltage may be set to a voltage higher than the third gamma reference voltage, and the third gamma reference voltage may be set to a voltage higher than the fourth gamma reference voltage.

The first data signal may be a data signal having a positive polarity which is output to the data lines in an i-th frame, and the second data signal may be a data signal having a negative polarity which is output to the data lines in an (i+1)-th frame.

A drive voltage and a half drive voltage may be applied to the first output buffer circuit, and the half drive voltage and a base voltage may be applied to the second output buffer circuit.

The drive voltage and the base voltage may be DC voltages.

The half drive voltage may be a signal which swings between the drive voltage and the base voltage and may be a modulated signal having a frequency and a phase corresponding to the frequency and the phase of the first touch electrode driving signal.

The first gamma reference voltage and the second gamma reference voltage may be set to voltages higher than the half drive voltage. The third gamma reference voltage and the fourth gamma reference voltage may be set to voltages lower than the half drive voltage.

A low-level voltage of the fourth gamma reference voltage may be set to be higher than the base voltage.

In consideration of load-free driving, a difference between a low-level voltage of the first gamma reference voltage and the drive voltage may be set to be equal to or greater than the amplitude of the first gamma reference voltage.

The data driving circuit may include: a digital-analog converter that receives the image digital signal, receives a first gamma reference voltage and a second gamma reference voltage having a frequency and a phase corresponding to the frequency and the phase of the first touch electrode driving signal, and converts the image digital signal into a first image analog signal in response to the first gamma reference voltage and the second gamma reference voltage; and an output buffer circuit that receives the first image analog signal and outputs the data signal to the data lines. The first gamma reference voltage may be set to a voltage higher than the second gamma reference voltage.

A drive voltage and a base voltage may be applied to the output buffer circuit.

A low-level voltage of the second gamma reference voltage may be set to be higher than the base voltage.

A difference between a low-level voltage of the first gamma reference voltage and the drive voltage may be set to be equal to or greater than the amplitude of the first gamma reference voltage.

A period of the first touch electrode driving signal may be shorter than a predetermined horizontal time.

Alternatively, a period of the first touch electrode driving signal may be longer than a predetermined horizontal time.

The touch driving circuit may supply the first touch electrode driving signal having the first amplitude or a second touch electrode driving signal corresponding to a DC voltage to the plurality of touch electrodes during an active time.

The touch driving circuit may supply a third touch electrode driving signal having a third amplitude different from the first amplitude to one or more of the plurality of touch electrodes during a blank time.

The first amplitude of the first touch electrode driving signal during the active time may be less than the third amplitude of the third touch electrode driving signal during the blank time.

The gate driving circuit may supply a first off-level gate voltage having a frequency and a phase corresponding to the frequency and the phase of the first touch electrode driving signal to the gate lines or supply a first on-level gate voltage which is offset by the first off-level gate voltage to the gate lines when the first touch electrode driving signal is output to the plurality of touch electrodes.

The gate driving circuit may supply a second off-level gate voltage which is a DC voltage to the gate lines or supply a second on-level gate voltage which is a DC voltage to the gate lines when the second touch electrode driving signal is output to the plurality of touch electrodes.

The gate driving circuit may supply a third off-level gate voltage having a frequency and a phase corresponding to the frequency and the phase of the third touch electrode driving signal to the gate lines when the third touch electrode driving signal is output to the plurality of touch electrodes.

The touch display device may further include a touch power circuit that outputs a gamma reference voltage having an amplitude corresponding to a first amplitude of the first touch electrode driving signal to the data driving circuit or outputs a gamma reference voltage corresponding to a DC voltage to the data driving circuit.

When it is an active time and the first touch electrode driving signal is output to the plurality of touch electrodes, the data driving circuit may convert an image digital signal into an image analog signal in response to a gamma reference voltage having a modulated signal pattern having a frequency and a phase corresponding to the frequency and the phase of the first touch electrode driving signal and output a data signal corresponding to the converted image analog signal to the data lines.

When it is an active time and the second touch electrode driving signal corresponding to a DC voltage is output to the plurality of touch electrodes, the data driving circuit may convert an image digital signal into an image analog signal in response to a gamma reference voltage corresponding to a DC voltage and output a data signal corresponding to the converted image analog signal to the data lines.

The gamma reference voltage may not be input to the data driving circuit during a blank time.

The touch driving circuit may output a third touch electrode driving signal having a third amplitude different from the first amplitude to all or some of the plurality of touch electrodes. The third touch electrode driving signal or a signal corresponding to the third touch electrode driving signal may be applied to all or some of the plurality of data lines.

The display panel, the data driving circuit, the gate driving circuit, and the touch driving circuit may be grounded to a DC ground voltage.

According to another aspect, embodiments of the disclosure provide a data driving circuit including: a digital-analog converter that converts an image digital signal to an image analog signal in response to a gamma reference voltage of a modulated signal pattern which swings with a predetermined amplitude; and an output buffer circuit that outputs a data signal corresponding to the converted image analog signal to the data lines.

The gamma reference voltage may be modulated in synchronization with a first touch electrode driving signal which swings with a first amplitude and is applied to the touch electrodes arranged in the display panel.

The digital-analog converter may convert an image digital signal into an image analog signal in response to a gamma reference voltage corresponding to a DC voltage when a second touch electrode driving signal corresponding to a DC voltage is applied to touch electrodes arranged in the display panel.

According to another aspect, embodiments of the disclosure provide a driving method of a touch display device, including: a step of converting an image digital signal into an image analog signal in response to a gamma reference voltage which is modulated in synchronization with a first touch electrode driving signal which swings with a first amplitude and is applied to the touch electrodes arranged in the display panel; and a step of outputting a data signal corresponding to the converted image analog signal to the data lines.

According to the embodiments of the disclosure, it is possible to provide a touch display device, a data driving circuit, and a driving method that can independently perform display and touch sensing.

According to the embodiments of the disclosure, it is possible to provide a touch display device, a data driving circuit, and a driving method that can effectively simultaneously perform display and touch sensing.

According to the embodiments of the disclosure, it is possible to provide a touch display device, a data driving circuit, and a driving method that can simultaneously perform display and touch sensing and achieve excellent display and touch sensing performance by minimizing or removing interference between display driving and touch driving.

According to the embodiments of the disclosure, it is possible to provide a touch display device, a data driving circuit, and a driving method that can operate to be adapted to various driving environments.

BRIEF DESCRIPTION OF THE DRAWINGS

FIG. 8 is a diagram illustrating touch electrode driving signals TDS in three cases of time-free driving in the touch display device according to the embodiments of the disclosure;

DETAILED DESCRIPTION

Figure 1:
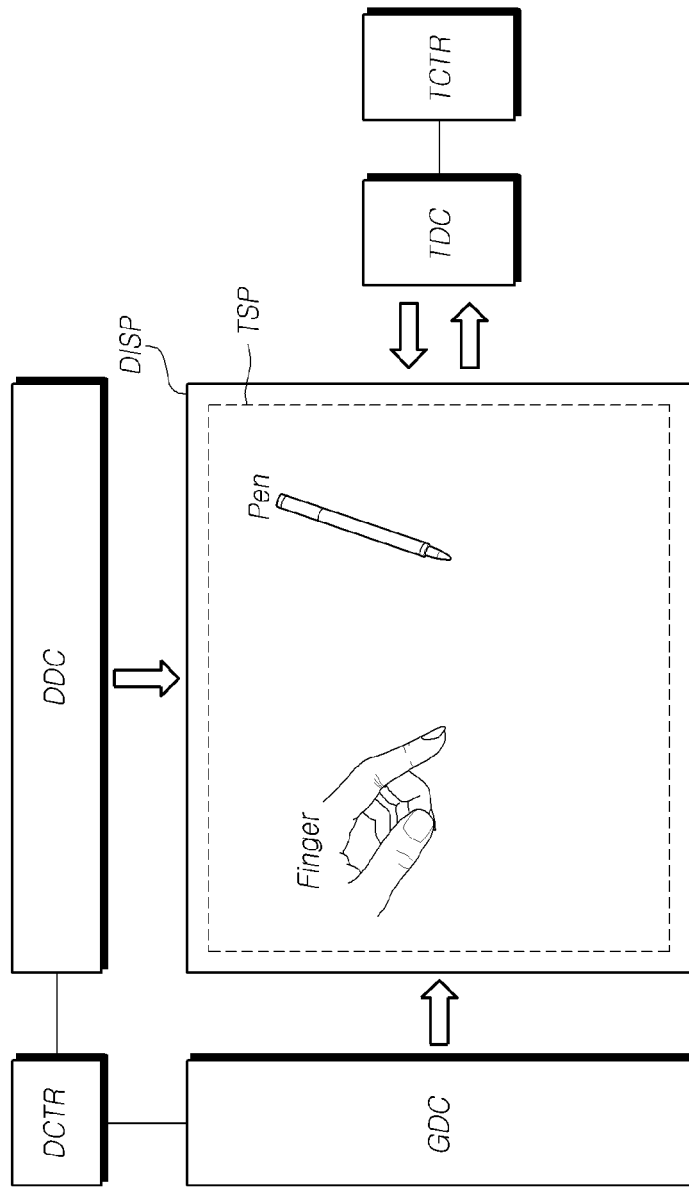
FIG. 1 is a diagram schematically illustrating a system configuration of a touch display device according to embodiments of the present disclosure.

Hereinafter, some embodiments of the present disclosure will be described in details with reference to the accompanying drawings. In describing the disclosure with reference to the accompanying drawings, the same elements will be referred to by the same reference numerals or signs regardless of the drawing numbers. When it is determined that detailed description of known configurations or functions involved in the invention makes the gist of the disclosure obscure, the detailed description thereof will not be made.

Terms such as first, second, A, B, (a), and (b) can be used to describe elements of the disclosure. These terms are merely used to distinguish one element from another element and the essence, order, sequence, number, or the like of the elements is not limited to the terms. If it is mentioned that an element is "linked," "coupled," or "connected" to another element, it should be understood that the element can be directly linked, coupled or connected to another element or still another element may be "interposed" therebetween or the elements may be "linked," "coupled," or "connected" to each other with still another element interposed therebetween.

Figure 2:
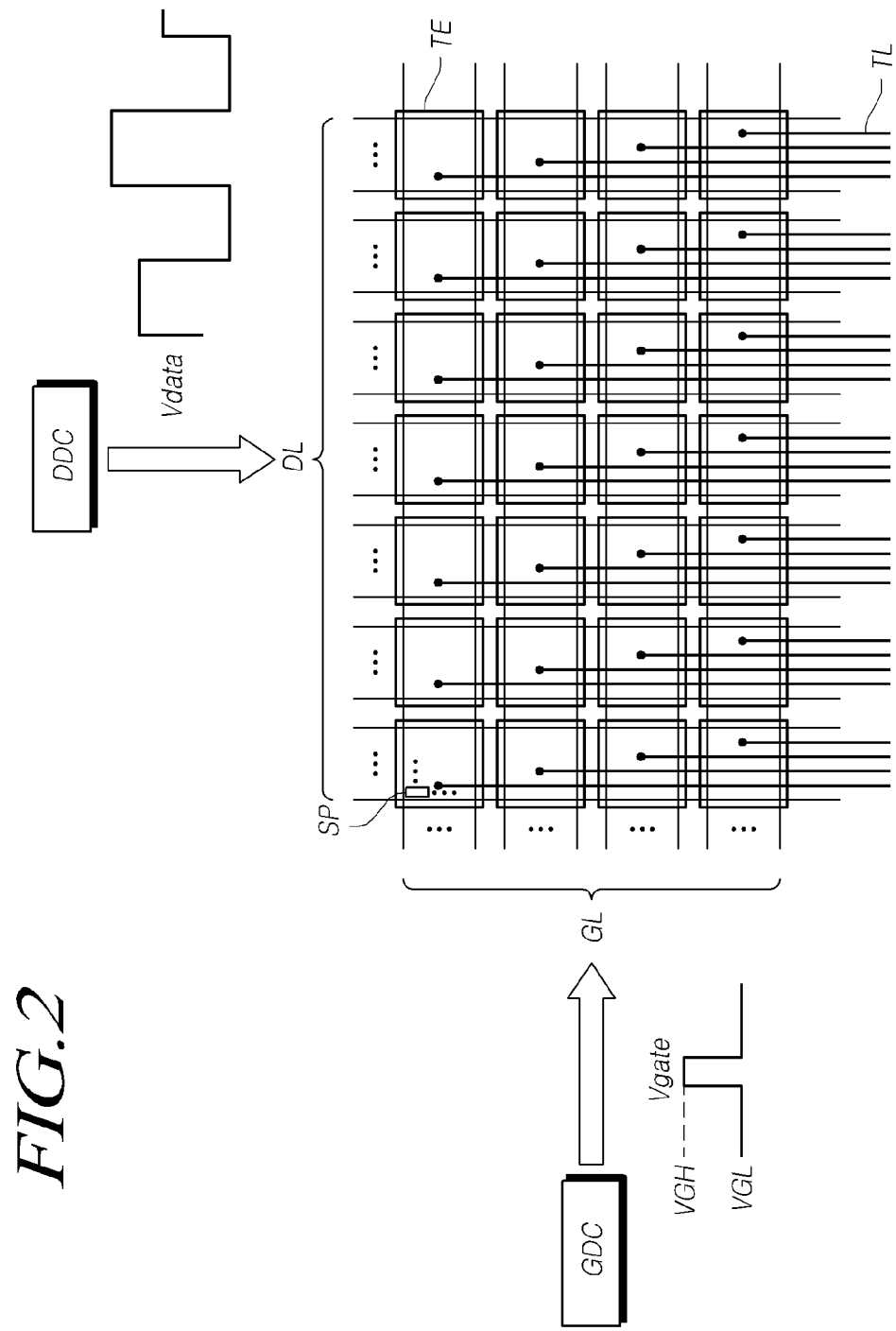
FIG. 2 is a diagram schematically illustrating display driving of the touch display device according to the embodiments of the disclosure.
Figure 3:
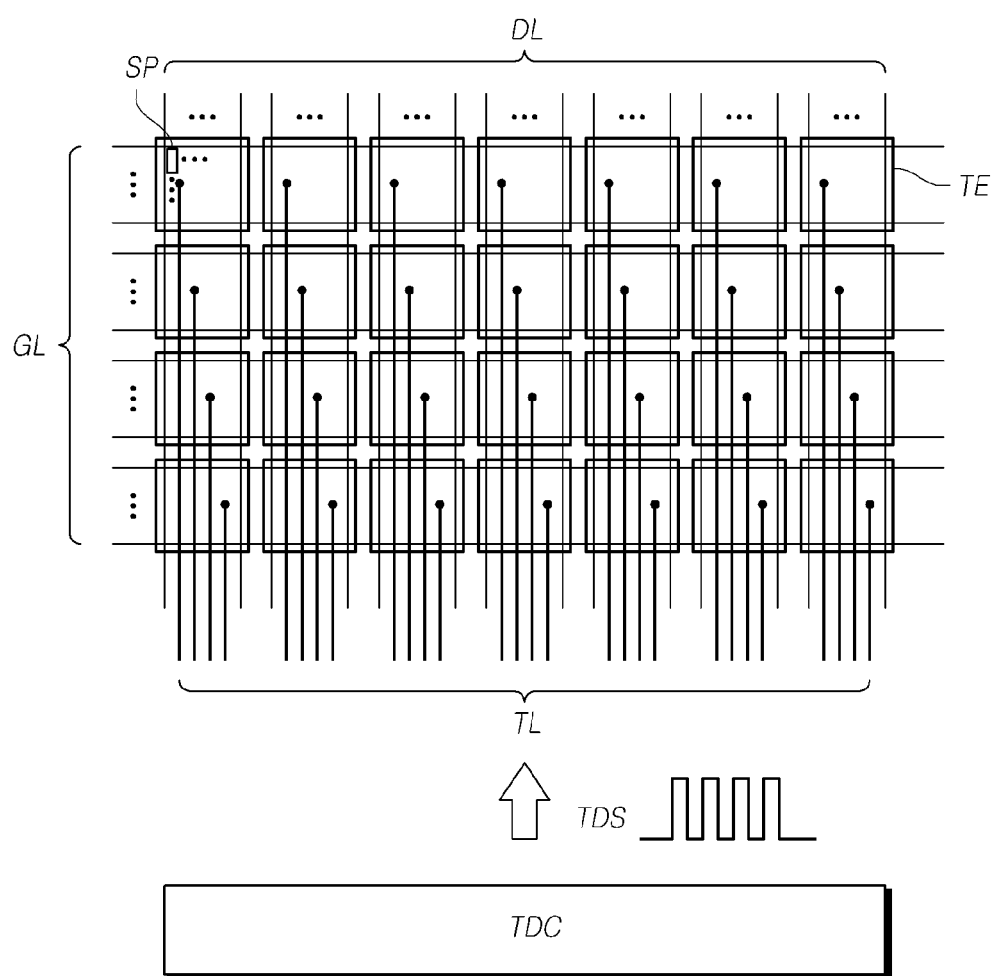
FIG. 3 is a diagram schematically illustrating touch driving of the touch display device according to the embodiments of the disclosure.

FIG. 1 is a diagram schematically illustrating a system configuration of a touch display device according to embodiments of the present disclosure. FIG. 2 is a diagram schematically illustrating display driving of the touch display device according to the embodiments of the disclosure. FIG. 3 is a diagram schematically illustrating touch driving of the touch display device according to the embodiments of the disclosure.

Referring to FIG. 1, a touch display device according to embodiments of the disclosure can provide a display function of displaying an image. The touch display device according to embodiments of the disclosure can also provide a touch sensing function of sensing a user's touch and a touch input function of performing an input process based on the user's touch using the touch sensing result.

In the following description, elements for providing a display function and display driving will be described with reference to FIGS. 1 and 2, and elements for providing a touch sensing function and touch driving will be described with reference to FIGS. 1 and 3.

Referring to FIGS. 1 and 2, a touch display device according to embodiments of the disclosure includes a display panel DISP in which a plurality of data lines DL and a plurality of gate lines GL are arranged and a plurality of subpixels SP defined by the plurality of data lines DL and the plurality of gate lines GL are arranged, a data driving circuit DDC that drives the plurality of data lines DL, a gate driving circuit GDC that drives the plurality of gate lines GL, and a display controller DCTR that controls the data driving circuit DDC and the gate driving circuit GDC.

The display controller DCTR supplies various control signals to the data driving circuit DDC and the gate driving circuit GDC and controls the data driving circuit DDC and the gate driving circuit GDC.

The display controller DCTR starts scanning at timings which are realized in each frame, converts input image data which is input from the outside to correspond to a data signal format which is used in the data driving circuit DDC, outputs the converted image data, and controls data driving at appropriate timings to correspond to the scanning.

The gate driving circuit GDC sequentially supplies a gate signal of an ON voltage or an OFF voltage to the plurality of gate lines GL under the control of the display controller DCTR.

When a specific gate line GL is selected by the gate driving circuit GDC, the data driving circuit DDC converts an image data signal which is received from the display controller DCTR into an image analog signal and supplies a data signal Vdata corresponding thereto to the plurality of data lines DL.

The display controller DCTR may be a timing controller which is used for normal display techniques or a control device that performs another control function in addition to the timing controller or may be a control device that is different from the timing controller.

The display controller DCTR may be embodied as a component separate from the data driving circuit DDC or may be embodied as an integrated circuit along with the data driving circuit DDC.

The data driving circuit DDC drives the plurality of data lines DL by supplying a data signal Vdata to the plurality of data lines DL. Here, the data driving circuit DDC is also referred to as a "source driver."

The data driving circuit DDC may include at least one source driver integrated circuit SDIC. Each source driver integrated circuit SDIC may include a shift register, a latch circuit, a digital-to-analog converter DAC, and an output buffer circuit. Each source driver integrated circuit SDIC may further include an analog-to-digital converter ADC in some cases.

Each source driver integrated circuit SDIC may be connected to a bonding pad of the display panel DISP in a tape automated bonding (TAB) system or a chip on glass (COG) system, may be disposed directly on the display panel DISP, or may be integrated and disposed on the display panel DISP in some cases. Each gate driver integrated circuit GDIC may be realized in a chip on film (COF) system in which it is mounted on a film connected to the display panel DISP.

The gate driving circuit GDC sequentially drives the plurality of gate lines GL by sequentially supplying a scan signal Vgate (which is also referred to as a scan voltage, a gate signal, or a gate voltage) to the plurality of gate lines GL. Here, the gate driving circuit GDC is also referred to as a "scan driver."

Here, the scan signal Vgate is constituted by an OFF-level gate voltage for closing the corresponding gate line GL and an ON-level gate voltage for opening the corresponding gate line GL.

More specifically, the scan signal Vgate is constituted by an OFF-level gate voltage for turning off transistors connected to the corresponding gate line GL and an ON-level gate voltage for turning on the transistors connected to the corresponding gate line GL.

When the transistors are of an N type, the OFF-level gate voltage may be a low-level gate voltage VGL and the ON-level gate voltage may be a high-level gate voltage VGH. When the transistors are of a P type, the OFF-level gate voltage may be a high-level gate voltage VGH and the ON-level gate voltage may be a low-level gate voltage VGL. In the following description, for the purpose of convenience of explanation, it is assumed that the OFF-level gate voltage is a low-level gate voltage VGL and the ON-level gate voltage is a high-level gate voltage VGH.

The gate driving circuit GDC may include at least one gate driver integrated circuit GDIC. Each gate driver integrated circuit GDIC may include a shift register and a level shifter.

Each gate driver integrated circuit GDIC may be connected to a bonding pad of the display panel DISP in a tape automated bonding (TAB) system or a chip on glass (COG) system or may be realized in a gate in panel (GIP) system and disposed directly on the display panel DISP. In some cases, each gate driver integrated circuit GDIC may be integrated and disposed on the display panel DISP. Each gate driver integrated circuit GDIC may be realized in a chip on film (COF) system in which it is mounted on a film connected to the display panel DISP.

The data driving circuit DDC may be disposed on only one side (for example, an upper side or a lower side) of the display panel DISP as illustrated in FIG. 1 or may be disposed on both sides (for example, the upper side and the lower side) of the display panel DISP depending on a driving system, a panel design system, or the like in some cases.

The gate driving circuit GDC may be disposed on only one side (for example, a right side or a left side) of the display panel DISP as illustrated in FIG. 1 or may be disposed on both sides (for example, the right side and the left side) of the display panel DISP depending on a driving system, a panel design system, or the like in some cases.

The touch display device according to the embodiments of the disclosure may be various types of display devices such as a liquid crystal display device and an organic light-emitting display device. The display panel DISP according to the embodiments may be various types of display panels such as a liquid crystal display panel and an organic light-emitting display panel.

Each subpixel SP arranged in the display panel DISP may include one or more circuit elements (for example, a transistor and a capacitor).

For example, when the display panel DISP is a liquid crystal display panel, a pixel electrode is disposed in each subpixel SP and a transistor is electrically connected between the pixel electrode and the corresponding data line DL. The transistor can be turned on by a scan signal Vgate which is supplied to a gate node via the corresponding gate line GL, and can output a data signal Vdata which is supplied to a source node (or a drain node) via the corresponding data line DL to the drain node (or the source node) and apply the data signal Vdata to the pixel electrode electrically connected to the drain node (or the source node) when it is turned on. An electric field is formed between the pixel electrode to which the data signal Vdata is applied and a common electrode to which a common voltage Vcom is applied, and a capacitor can be formed between the pixel electrode and the common electrode.

The structure of each subpixel SP can be determined variously depending on a panel type, a provided function, a design system, and the like.

Referring to FIGS. 1 and 3, the touch display device according to the embodiments of the disclosure may include a touch panel TSP, a touch driving circuit TDC that drives the touch panel TSP and performs sensing, and a touch controller TCTR that senses a touch using the sensing result of the touch panel TSP from the touch driving circuit TDC in order to provide a touch sensing function.

A user's pointer can touch or approach the touch panel TSP. Touch sensors may be disposed on the touch panel TSP.

Here, a user's pointer may be a finger or a pen.

The pen may be a passive pen that does not have a signal transmitting/receiving function or may be an active pen having a signal transmitting/receiving function. The touch driving circuit TDC can supply a touch driving signal to the touch panel TSP and sense the touch panel TSP. The touch controller TCTR may sense a touch using the sensing result of the touch panel TSP from the touch driving circuit TDC. Here, "senses a touch" means that whether a touch has been made and/or a touch coordinate is determined according to one embodiment.

The touch panel TSP may be an outer-mounted type in which it is disposed outside the display panel DISP or an embedded type in which it is disposed inside the display panel DISP.

When the touch panel TSP is an outer-mounted type, the touch panel TSP and the display panel DISP may be separately manufactured and then be coupled to each other by an adhesive or the like. The outer-mounted touch panel TSP is also referred to as an Add-on type.

When the touch panel TSP is an embedded type, the touch panel TSP can be manufactured together in the process of manufacturing the display panel DISP. That is, touch sensors constituting the touch panel TSP can be disposed in the display panel DISP. The embedded type touch panel TSP may be an In-cell type, an On-cell type, a hybrid type, or the like.

On the other hand, for the purpose of convenience of explanation, it is assumed in the following description that the touch panel TSP is an embedded type in which it is disposed inside the display panel DISP.

When the touch panel TSP is embedded in the display panel DISP, that is, when a plurality of touch electrodes TE are arranged in the display panel DISP, the plurality of touch electrodes TE may be disposed in the display panel DISP separately from electrodes which are used for display driving or the electrodes which are disposed in the display panel DISP for display driving may be used as the plurality of touch electrodes TE.

For example, the common electrode disposed in the display panel DISP may be divided into a plurality of parts and may be used as the plurality of touch electrodes TE. That is, the plurality of touch electrodes TE disposed in the display panel DISP may be electrodes for touch sensing and may be electrodes for display driving. In the following description, it is assumed that the plurality of touch electrodes TE disposed in the display panel DISP are common electrodes.

The touch controller TCTR may be realized, for example, by a micro control unit MCU or a processor.

The display controller DCTR and the touch controller TCTR may be separately embodied or may be integrally embodied.

Referring to FIG. 3, a plurality of touch electrodes TE are arranged in the touch panel TSP of the touch display device according to the embodiments of the disclosure and a plurality of touch lines TL that electrically connect the plurality of touch electrodes TE to the touch driving circuit TDC are disposed therein. One or more touch lines TL can be electrically connected to each touch electrode TE via one or more contact holes.

The touch display device according to the embodiments of the disclosure can sense a touch based on self-capacitance of the touch electrodes TE or sense a touch based on mutual-capacitance between the touch electrodes TE.

When the touch display device according to the embodiments of the disclosure senses a touch based on self-capacitance, a plurality of first touch electrode lines and a plurality of second touch electrode lines can be arranged to cross each other. For example, the plurality of first touch electrode lines can be arranged in an X-axis direction and the plurality of second touch electrode lines can be arranged in a Y-axis direction. Here, each of the first touch electrode line and the second touch electrode line may be a single touch electrode with a bar shape or may have a shape in which two or more touch electrodes are electrically connected to each other. The first touch electrode lines can be referred to as driving lines, driving electrodes, driving touch electrode lines, Tx lines, Tx electrodes, or Tx touch electrode lines. The second touch electrode lines can be referred to as receiving lines, receiving electrodes, receiving touch electrode lines, sensing lines, sensing electrode, sensing touch electrode lines, Rx lines, Rx electrodes, or Rx touch electrode lines.

In this case, the touch driving circuit TDC can supply a driving signal to one or more of the plurality of first touch electrode lines, sense the second touch electrode lines, and output sensing data. The touch controller TCTR can calculate whether there is a touch and/or a touch coordinate using the sensing data.

When the touch display device according to the embodiments of the disclosure senses a touch based on mutual-capacitance, a plurality of touch electrodes TE can be separately arranged in the touch panel TSP as illustrated in FIG. 3.

In this case, the touch driving circuit TDC can supply a driving signal (hereinafter referred to as a touch electrode driving signal TDS) to all or some of the plurality of touch electrodes TE, sense one or more touch electrodes TE to which the driving signal has been supplied, output sensing data. The touch controller TCTR can calculate whether there is a touch and/or a touch coordinate using the sensing data.

In the following description, for the purpose of explanation, it is assumed that the touch display device according to the embodiments of the disclosure senses a touch based on self-capacitance and that the touch panel TSP is configured as illustrated in FIGS. 2 and 3.

The touch electrode driving signal TDS which is output from the touch driving circuit TDC may be a signal of a constant voltage or may be a signal of a variable voltage.

When the touch electrode driving signal TDS is a signal of a variable voltage, the touch electrode driving signal TDS may have various signal waveforms such as a sinusoidal waveform, a triangular waveform, or a rectangular waveform.

In the following description, it is assumed that, when the touch electrode driving signal TDS is a signal of a variable voltage, the touch electrode driving signal TDS is a pulse signal including two or more pulses. When the touch electrode driving signal TDS is a pulse signal including two or more pulses, the touch electrode driving signal TDS may have a constant frequency or may have a variable frequency.

Referring to FIGS. 2 and 3, the size of an area which is occupied by one touch electrode TE may correspond to the size of an area which is occupied by one subpixel SP or may correspond to the size of an area which is occupied by two or more subpixels SP.

A plurality of touch electrodes TE are arranged in one touch electrode array, and a plurality of touch lines TL which are electrically connected to the plurality of touch electrodes TE can overlap the plurality of touch electrodes TE. For example, when it is assumed that a plurality of touch electrodes TE arranged in one touch electrode array include a first touch electrode and a second touch electrode, a first touch line connected to the first touch electrode can overlap the second touch electrode but be electrically isolated from the second touch electrode.

Figure 4:
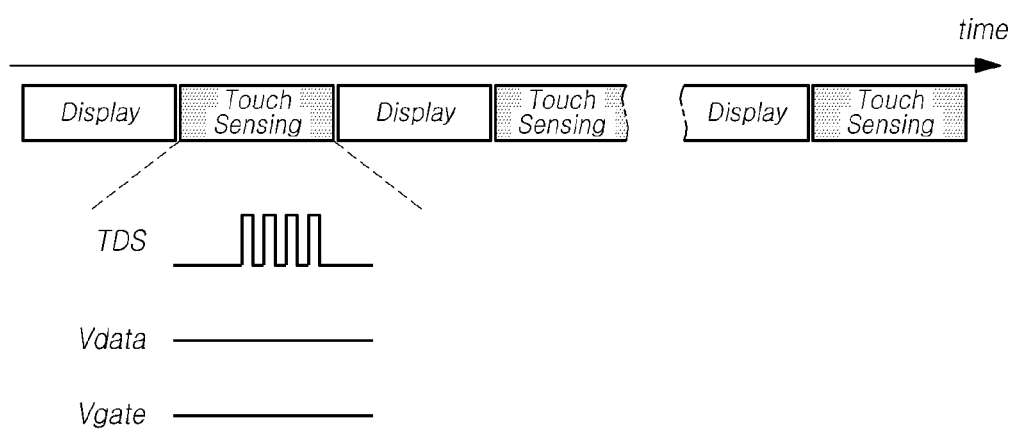
FIGS. 4 and 5 are diagrams illustrating a time-division driving system of the touch display device according to the embodiments of the disclosure.
Figure 5:
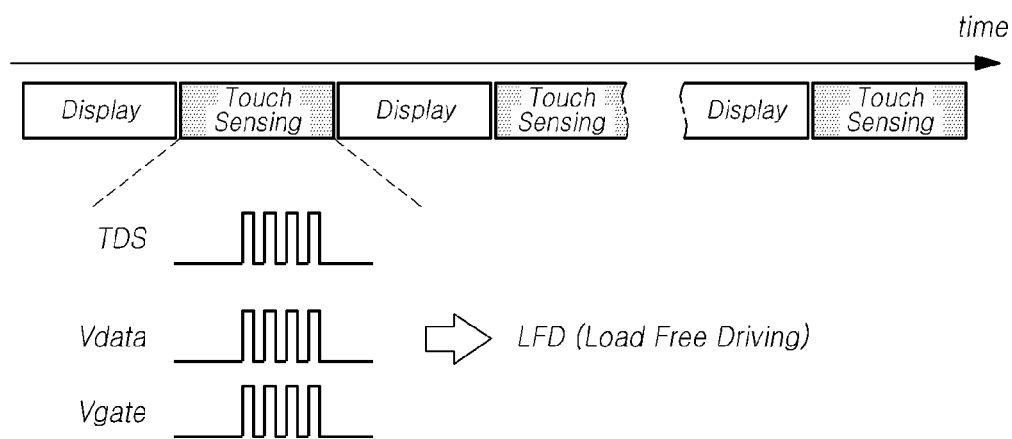

FIGS. 4 and 5 are diagrams illustrating a time-division driving (TDD) system of the touch display device according to the embodiments of the disclosure.

Referring to FIG. 4, the touch display device according to the embodiments of the disclosure can alternately perform display and touch sensing. In this way, a system in which display driving for display and touch driving for touch sensing are alternately performed is referred to as a time-division driving system.

In the time-division driving system, a display period for display and a touch sensing period for touch sensing alternate. The touch display device can perform display driving in the display period. The touch display device can perform touch driving in the touch sensing period.

In an example of the time-division driving system, one frame time can be divided into a display period and a touch sensing period. In another example of the time-division driving system, one frame time can be divided into two or more display periods and one or two or more touch sensing periods.

Referring to FIG. 4, in the time-division driving system, the touch electrode driving signal TDS can be applied to one or more of the plurality of touch electrodes TE. At this time, the plurality of data lines DL and the plurality of gate lines GL may not be driven.

In this case, unnecessary parasitic capacitance due to a potential difference can be formed between a touch electrode TE to which the touch electrode driving signal TDS is applied and one or more data lines DL located in the vicinity thereof. This unnecessary parasitic capacitance can increase an RC delay between the corresponding touch electrode TE and the touch line TL connected thereto to decrease touch sensitivity.

In this case, unnecessary parasitic capacitance due to a potential difference can be formed between a touch electrode TE to which the touch electrode driving signal TDS is applied and one or more gate lines GL located in the vicinity thereof. This unnecessary parasitic capacitance can increase an RC delay between the corresponding touch electrode TE and the touch line TL connected thereto to decrease touch sensitivity.

In this case, unnecessary parasitic capacitance due to a potential difference can be formed between a touch electrode TE to which the touch electrode driving signal TDS is applied and one or more other touch electrodes TE located in the vicinity thereof. This unnecessary parasitic capacitance can increase an RC delay between the corresponding touch electrode TE and the touch line TL connected thereto to decrease touch sensitivity.

The above-mentioned RC delay is referred to as a time constant or a load.

In order to remove the load, the touch display device according to the embodiments of the disclosure can perform load-free driving (LFD) in the touch sensing period (FIG. 5).

In the touch display device according to the embodiments of the disclosure, when the touch electrode driving signal TDS is applied to all or some of the plurality of touch electrodes TE at the time of load-free driving, a load-free driving signal can be applied as a data signal Vdata to all the data lines DL or some data lines DL with a likelihood that parasitic capacitance will be formed.

In the touch display device according to the embodiments of the disclosure, when the touch electrode driving signal TDS is applied to all or some of the plurality of touch electrodes TE at the time of load-free driving, a load-free driving signal can be applied as a data signal Vdata to all the gate lines GL or some gate lines GL with a likelihood that parasitic capacitance will be formed.

In the touch display device according to the embodiments of the disclosure, when the touch electrode driving signal TDS is applied to some of the plurality of touch electrodes TE at the time of load-free driving, a load-free driving signal can be applied as a data signal Vdata to all the touch electrodes or some other touch electrodes TE with a likelihood that parasitic capacitance will be formed.

The load-free driving signal may be a touch electrode driving signal or may be a signal having signal characteristics equal or similar to those of the touch electrode driving signal.

For example, the frequency and the phase of the load-free driving signal may be completely equal to the frequency and the phase of the touch electrode driving signal TDS or may be equal thereto within a predetermined error range. The amplitude of the load-free driving signal and the amplitude of the touch electrode driving signal TDS may be equal completely or may be equal within a predetermined error range, and may have an intentional difference in some cases.

Figure 6:
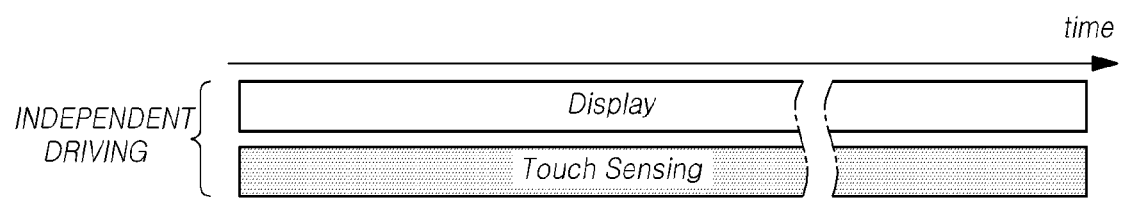
FIG. 6 is a diagram illustrating a time-free driving system of the touch display device according to the embodiments of the disclosure.

FIG. 6 is a diagram illustrating a time-free driving (TFD) system of the touch display device according to the embodiments of the disclosure.

Referring to FIG. 6, the touch display device according to the embodiments of the disclosure can independently perform display and touch sensing. In this way, a driving system in which display driving for display and touch driving for touch sensing are independently performed is referred to as a time-free driving system.

In the time-free driving system, display driving for display and touch driving for touch sensing may be simultaneously performed. In a certain period, only display driving for display can be performed or only touch driving for touch sensing can be performed.

Figure 7A:
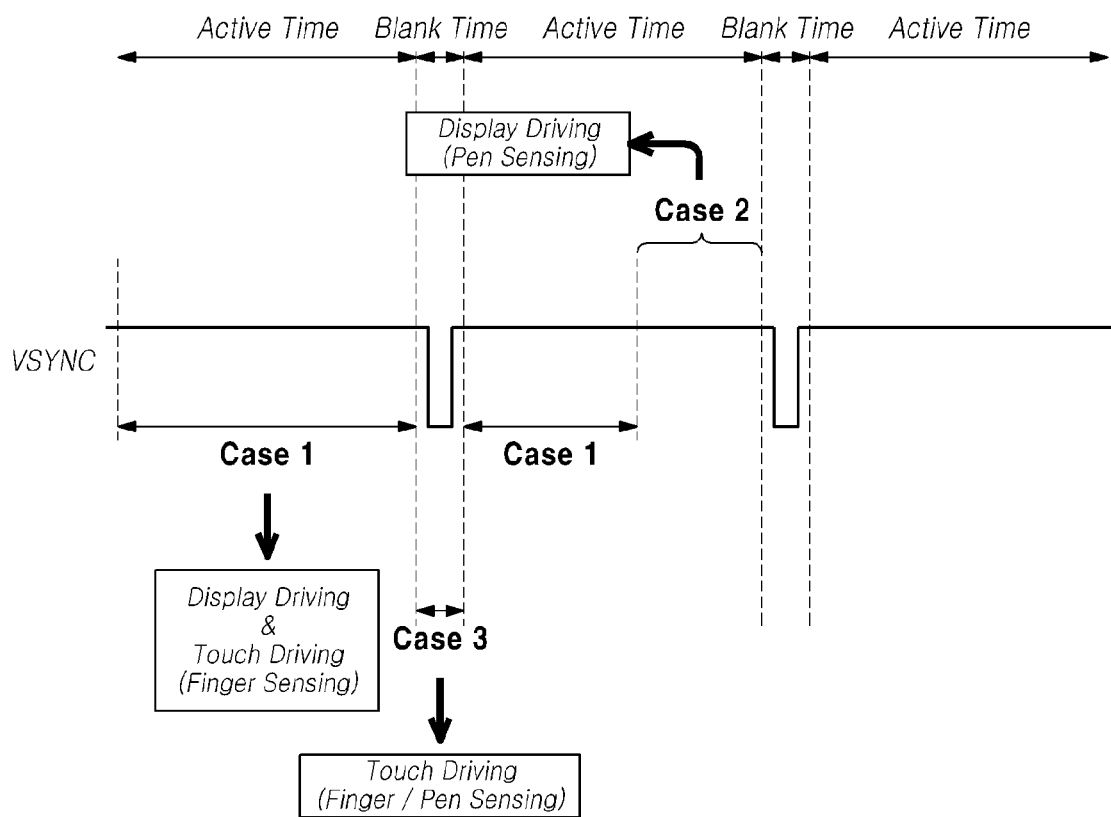
FIG. 7A is a diagram illustrating three cases of time-free driving in the touch display device according to the embodiments of the disclosure.
Figure 7B:
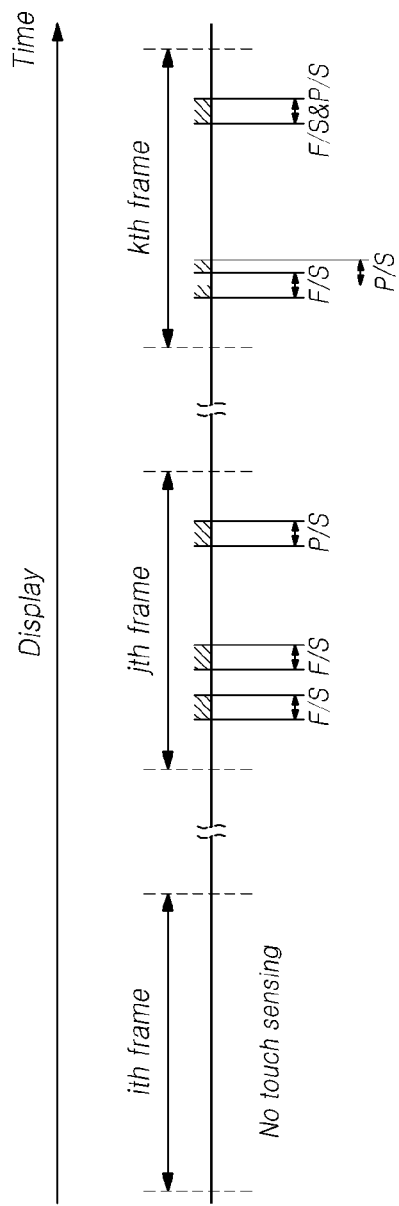
FIG. 7B is a diagram illustrating various timings for finger sensing and pen sensing based on the time-free driving system in the touch display device according to the embodiments of the disclosure.

FIG. 7A is a diagram illustrating three cases (Cases 1, 2, and 3) of time-free driving when the touch display device according to the embodiments of the disclosure performs time-free driving. FIG. 7B is a diagram illustrating various timings for finger sensing (F/S) and pen sensing (P/S) based on the time-free driving system in the touch display device according to the embodiments of the disclosure. FIG. 8 is a diagram illustrating touch electrode driving signals TDS in three cases (Cases 1, 2, and 3) of the time-free driving in the touch display device according to the embodiments of the disclosure.

In Case 1 of time-free driving, the touch display device can simultaneously perform display driving and touch driving.

In Case 1, the touch display device can supply a touch electrode driving signal TDS of a variable voltage to the touch electrodes TE in order to perform touch driving.

In the following description, the touch electrode driving signal TDS which is applied to the touch electrodes TE in Case 1 is referred to as a first touch electrode driving signal TDS1. The first touch electrode driving signal TDS1 has a first amplitude AMP1.

In Case 1, the touch display device can perform touch driving and sense a touch of a finger with the touch panel TSP. This touch sensing is referred to as finger sensing.

Alternatively, in Case 1, the touch display device can perform touch driving and sense a touch of a finger or a pen when the finger or the pen does not touch the touch panel TSP but approaches the touch panel TSP. This touch sensing is referred to as hover sensing.

In Case 2 of time-free driving, the touch display device can perform only display driving.

In Case 2, since the touch display device does not need to sense a touch of a finger, the touch display device does not perform general touch driving. That is, the touch display device does not supply the touch electrode driving signal TDS of a variable voltage to the plurality of touch electrodes TE which are disposed in the touch panel TSP.

In Case 2, the touch display device can supply the touch electrode driving signal TDS of a DC voltage. In the following description, the touch electrode driving signal TDS which is applied to the touch electrodes TE in Case 2 is referred to as a second touch electrode driving signal TDS2.

On the other hand, in Case 2, the touch display device can receive a pen signal output from a pen and sense the pen. The touch display device can acquire a result of pen sensing, a position, a tilt, and a pressure (a pen pressure) of a pen, or various additional information.

In Case 3 of time-free driving, the touch display device can perform only touch driving.

In Case 3, the touch display device can supply a touch electrode driving signal TDS of a variable voltage to the touch electrodes TE for the purpose of touch driving.

In the following description, the touch electrode driving signal TDS which is applied to the touch electrodes TE in Case 3 is referred to as a third touch electrode driving signal TDS3. The third touch electrode driving signal TDS3 has a third amplitude AMP3 which is different from the first amplitude AMP1.

In Case 3, the touch display device can sense a touch of a finger with the touch panel TSP by performing touch driving.

Referring to FIG. 7A, among three cases (Cases 1, 2, and 3) of time-free driving in the touch display device, Case 1 can be carried out in an active time, Case 3 can be carried out in a blank time. Here, an active time corresponds to a time in which a screen of one frame is displayed, and a blank time corresponds to a time required until a screen of a next frame is displayed after a screen of one frame has been displayed.

Referring to FIG. 7A, Case 1 can be switched to Case 2 in the active time.

Referring to FIG. 7A, in the active time, the touch display device can stop touch driving for finger sensing while simultaneously carrying out display driving and touch driving (Case 1 is carried out) (that is, Case 1 is switched to Case 2).

In Cases 1 and 3, touch electrode driving signals TDS1 and TDS3 having amplitudes AMP1 and AMP3 respectively can be applied to the touch electrodes TE at the time of touch driving for finger sensing.

In Case 2, a touch electrode driving signal TDS2 of a DC voltage can be applied to the touch electrodes TE for the purpose of pen sensing.

On the other hand, referring to FIG. 8, the first amplitude AMP1 of the first touch electrode driving signal TDS1 which is applied to the touch electrodes TE when display driving and touch driving are simultaneously performed (Case 1) can be less than the third amplitude AMP3 of the third touch electrode driving signal TDS3 which is applied to the touch electrodes TE when only touch driving is performed (Case 3).

The first amplitude AMP1 of the first touch electrode driving signal TDS1 which is applied to the touch electrodes TE in the active time can be less than the third amplitude AMP3 of the third touch electrode driving signal TDS3 which is applied to the touch electrodes TE in the blank time.

Referring to FIGS. 7A and 8, in the active time, the touch driving circuit TDC can supply the first touch electrode driving signal TDS1 having the first amplitude AMP1 or the second touch electrode driving signal TDS2 having a DC voltage to the plurality of touch electrodes TE.

Referring to FIGS. 7A and 8, in the blank time, the touch driving circuit TDC can supply the third touch electrode driving signal TDS3 having the third amplitude AMP3 to one or more of the plurality of touch electrodes TE.

On the other hand, driving corresponding to Case 1 may be performed in one frame or may be performed in only a partial time interval of one frame. Driving corresponding to Case 2 may be performed in all frames or some frames or may be performed in only a partial time interval of one frame. At the time of driving corresponding to Case 3, driving for finger sensing may be performed or driving for pen sensing may be performed.

Referring to FIG. 7B, in the time-free driving system of the touch display device according to the embodiments of the disclosure, finger sensing F/S and pen sensing P/S can be performed at various timings.

For example, as in the i-th frame, only display driving for display may be performed without performing finger sensing F/S and pen sensing P/S in one frame. This corresponds to Case 2 in which pen sensing P/S is not performed.

As in the j-th frame, finger sensing F/S may be performed in only a partial time interval necessary in one frame time. This corresponds to Case 1. Pen sensing P/S may be performed in only a partial time interval necessary in one frame time. This corresponds to Case 2. In one frame, finger sensing F/S and pen sensing P/S may be performed in partial time intervals which do not overlap in one frame time.

As in the k-th frame, finger sensing F/S and pen sensing P/S may be performed in time intervals overlapping in one frame time. In this case, the sensing results of finger sensing F/S and pen sensing P/S can be distinguished by a predetermined algorithm or signal analysis based on a sensing position using the touch controller TCTR or the like.

In addition to the above-mentioned examples, display and touch sensing (finger sensing and/or pen sensing) can be independently performed at various timings.

Figure 9:
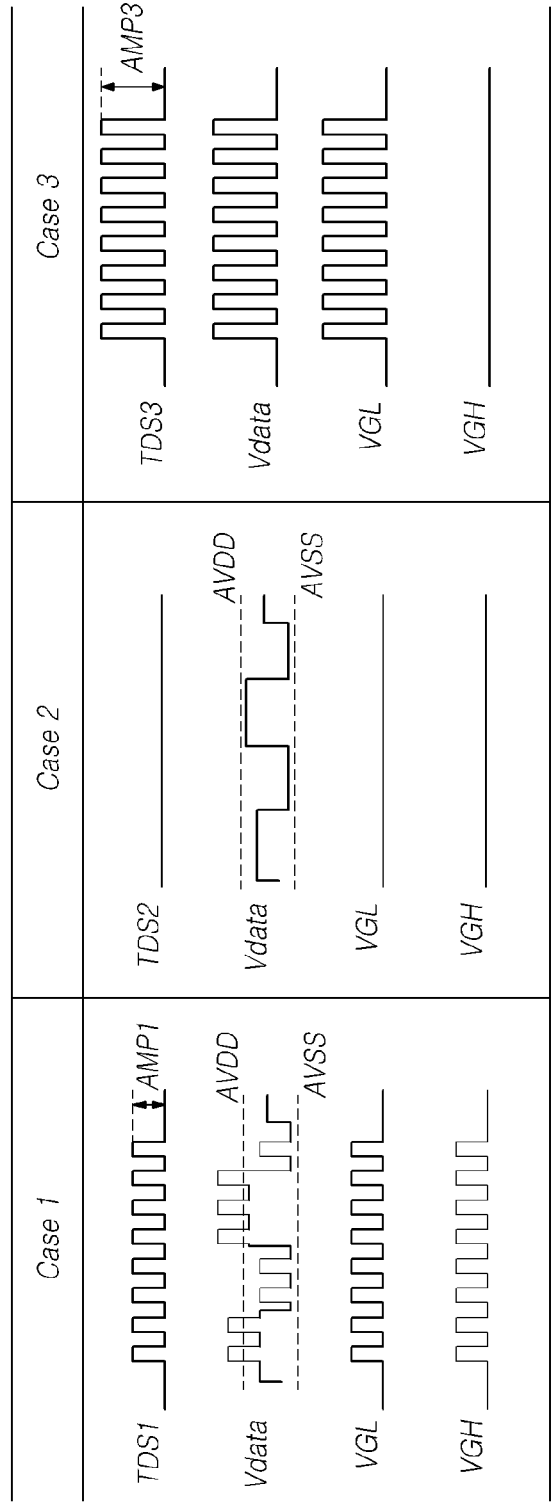
FIG. 9 is a diagram illustrating waveforms of principal signals in three cases of time-free driving in the touch display device according to the embodiments of the disclosure.

FIG. 9 is a diagram illustrating waveforms of principal signals TDS1, Vdata, VGL, and VGH in three cases (Case 1, Case 2, and Case 3) of time-free driving in the touch display device according to the embodiments of the invention.

Cases 1 and 2 are case of driving during an active time. Case 3 is a case of driving during a blank time.

In the three cases, a touch electrode driving signal TDS which is applied to the touch electrodes TE, a data signal Vdata which is supplied to the data lines DL, and an OFF-level gate voltage VGL and an ON-level gate voltage VGH which are supplied to the gate driving circuit GDC to generate a scan signal which is supplied to the gate lines GL are principal signals.

In Case 2 in which only display driving is performed in the active time, the touch electrode driving signal TDS which is applied to the touch electrodes TE is a second touch electrode driving signal TDS2 of a DC voltage.

The data signal Vdata which is applied to the data lines DL is a signal corresponding to an image analog signal into which an image digital signal is converted in a digital-analog conversion manner for the purpose of display and may be a pixel voltage which is applied to a pixel electrode of the corresponding subpixel SP via the corresponding data line DL. The data signal Vdata can swing between a drive voltage AVDD and a base voltage AVSS.

The OFF-level gate voltage VGL and the ON-level gate voltage VGH constituting the scan signal Vgate which is applied to the gate lines GL are DC voltages.

As described above, the touch electrodes TE can also serve as a common electrode for display driving. Accordingly, in Case 2 in which only display driving is performed in the active time, the second touch electrode driving signal TDS2 which is applied to the touch electrodes TE corresponds to a common voltage for display.

Accordingly, in the corresponding subpixel SP, an electric field is formed between the pixel electrode and the touch electrode TE due to a voltage difference between the data signal Vdata which is applied to the pixel electrode via the data line DL and the second touch electrode driving signal TDS2 corresponding to the common voltage which is applied to the touch electrode TE, and thus desired light can be emitted from the subpixel SP.

In Case 3 in which only touch driving is performed in the blank time, the touch electrode driving signal TDS which is applied to the touch electrodes TE is a third touch electrode driving signal TDS3 having the third amplitude AMPS.

In the blank time, the data lines DL may be supplied with a data signal Vdata corresponding to a DC voltage or may be in a floating state. In the blank time, the gate lines GL may be supplied with a scan signal Vgate of an OFF-level gate voltage VGL corresponding to a DC voltage or may be in an electrical floating state.

When load-free driving is performed in the blank time in which only touch driving is performed, the data lines DL and the gate lines GL can swing in the same way as the touch electrodes TE from the viewpoint of voltage characteristics.

The data signal Vdata which is applied to the data lines DL in the blank time in accordance with load-free driving may be a third touch electrode driving signal TDS3 or a load-free driving signal having signal characteristics (for example, a phase, a frequency, and an amplitude) equal or similar to those of the third touch electrode driving signal TDS3.

The OFF-level gate voltage VGL which is applied to the gate lines GL in the blank time in accordance with load-free driving may be a third touch electrode driving signal TDS3 or a load-free driving signal having signal characteristics (for example, a phase, a frequency, and an amplitude) equal or similar to those of the third touch electrode driving signal TDS3.

In Case 1 in which display driving and touch driving are simultaneously performed in the active time, the touch electrode driving signal TDS which is applied to the touch electrodes TE is a first touch electrode driving signal TDS1 having the first amplitude AMP1.

In Case 1, since display driving and touch driving are simultaneously performed in the active time, the first touch electrode driving signal TDS1 is a driving signal for touch sensing and also serves as a common voltage Vcom for display.

The first touch electrode driving signal TDS1 which is applied to the touch electrodes TE should have a predetermined voltage difference for display from the data signal Vdata corresponding to a pixel voltage for display.

In Case 1 in which display driving and touch driving are simultaneously performed, the first touch electrode driving signal TDS1 perform two functions (a driving signal for touch sensing and a common voltage for display).

As described above, since the common voltage Vcom corresponding to the first touch electrode driving signal TDS1 is not a fixed voltage but a variable voltage, the data signal Vdata which is applied to the data lines DL should be subjected to an additional voltage variation of the first amplitude AMP1 of the first touch electrode driving signal TDS1 in addition to the original voltage variation for display in order to prevent the data lines DL from being affected by touch driving.

Accordingly, in the voltage difference between the data signal Vdata corresponding to the pixel voltage and the first touch electrode driving signal TDS1 corresponding to the common voltage Vcom, a voltage variation part (that is, the first amplitude AMP1) of the first touch electrode driving signal TDS1 is excluded and only the original voltage variation for display is left. Accordingly, normal display can be performed.

Accordingly, the data signal Vdata in Case 1 in which display driving and touch driving are simultaneously performed may have a signal pattern in which the data signal Vdata and the first touch electrode driving signal TDS1 in the case (Case 2) in which only display driving is performed are combined.

In other words, the data signal Vdata in Case 1 in which display driving and touch driving are simultaneously performed may have a signal pattern which is obtained by offsetting the original data signal Vdata in the case (Case 2) in which only display driving is performed using the first touch electrode driving signal TDS1. Here, the data signal Vdata may be subjected to a large voltage variation between a drive voltage AVDD and a base voltage AVSS.

Accordingly, the voltage difference between the data signal Vdata and the first touch electrode driving signal TDS1 in Case 1 in which display driving and touch driving are simultaneously performed is the same as a voltage difference between the data signal Vdata and the second touch electrode driving signal TDS2 in Case 2 in which only display driving is performed.

In Case 1, since display driving and touch driving are simultaneously performed, load-free driving may be required.

That is, in Case 1, since display driving and touch driving are simultaneously performed, it may be necessary to prevent parasitic capacitance from being formed between the touch electrodes TE and the data lines DL due to touch driving and to prevent parasitic capacitance from being formed between the touch electrodes TE and the gate lines GL due to touch driving.

As described above, in Case 1, since the touch electrodes TE and the data lines DL fluctuate with a voltage variation of the first touch electrode driving signal TDS1, only a voltage difference for display is present between the touch electrodes TE and the data lines DL and unnecessary parasitic capacitance due to touch driving is not formed. That is, in Case 1, load-free driving for the data lines DL is necessarily performed.

In Case 1, the OFF-level gate voltage VGL and the ON-level gate voltage VGH which are supplied to the gate driving circuit GDC such that the gate driving circuit GDC can generate a scan signal SCAN which is applied to the gate lines GL may be a load-free driving signal having signal characteristics (for example, a phase, a frequency, and an amplitude) equal or similar to those of the third touch electrode driving signal TDS3.

The above-mentioned time-free driving of the touch display device according to the embodiments of the invention will be described below in more detail.

Figure 10:
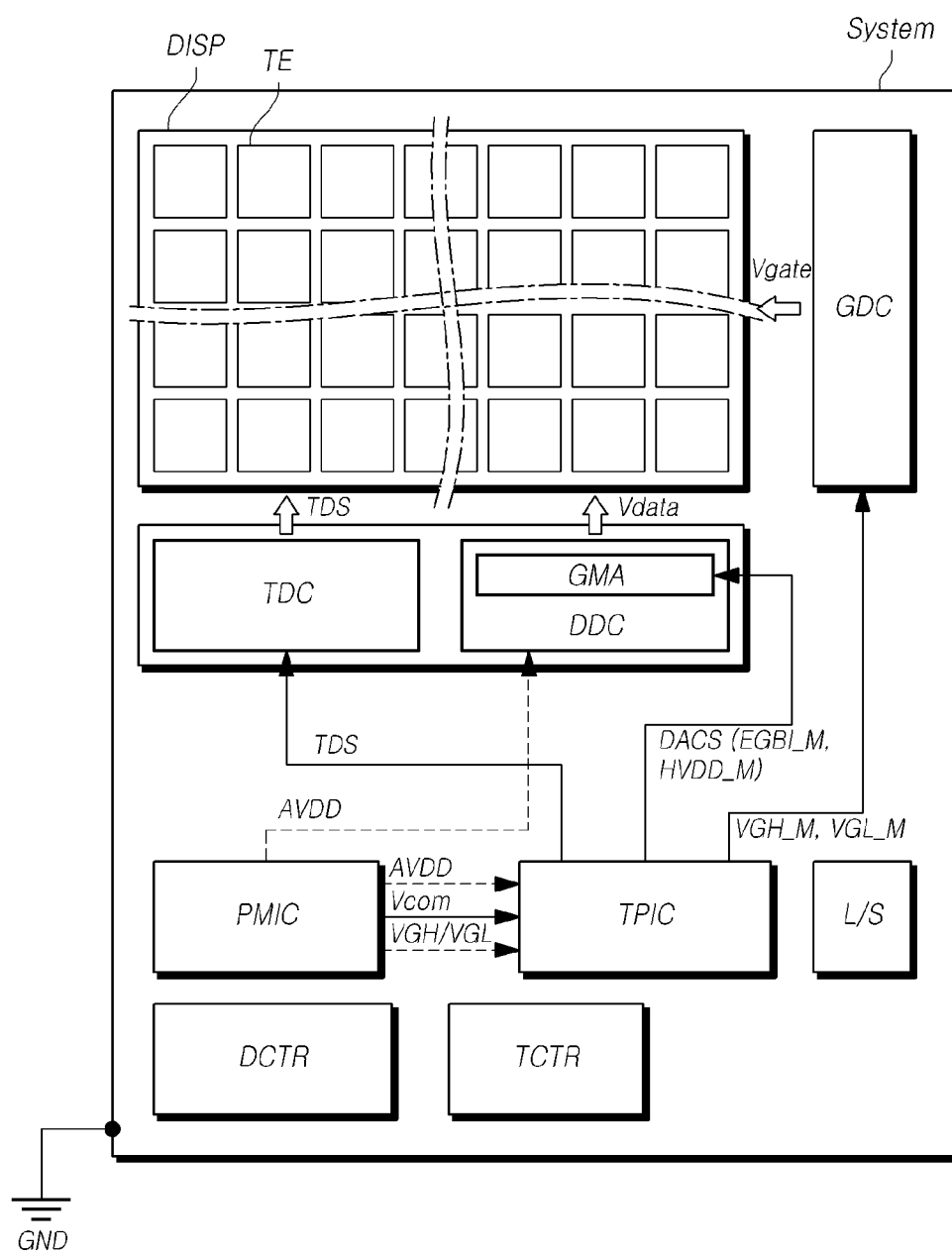
FIG. 10 is a diagram illustrating a time-free driving system in the touch display device according to the embodiments of the disclosure.

FIG. 10 is a diagram illustrating a time-free driving system in the touch display device according to the embodiments of the invention.

Referring to FIG. 10, the touch display device according to the embodiments of the disclosure includes a display panel DISP, a gate driving circuit GDC, a data driving circuit DDC, and a touch driving circuit TDC.

In the display panel DISP, a plurality of data lines DL and a plurality of gate lines GL are arranged and a plurality of touch electrodes TE are arranged. The gate driving circuit GDC is able to be electrically connected to the plurality of gate lines GL and drives the plurality of gate lines GL. The data driving circuit DDC is able to be electrically connected to the plurality of data lines DL and drives the plurality of data lines DL. The touch driving circuit TDC is able to be electrically connected to the plurality of touch electrodes TE and drives the plurality of touch electrodes TE.

The touch display device according to the embodiments of the disclosure may further include a display controller DCTR that controls driving operations of the data driving circuit DDC and the gate driving circuit GDC and a touch controller TCTR that controls a driving operation of the touch driving circuit TDC or calculates whether there is a touch and/or touch coordinates using sensing data which is output from the touch driving circuit TDC.

The touch display device according to the embodiments of the disclosure may further include a touch power circuit TPIC and a power management circuit PMIC for supplying power.

The touch power circuit TPIC can supply an ON-level gate voltage VGH_H and an OFF-level gate voltage VGL_M which are required for driving the gate lines GL to the gate driving circuit GDC.

The touch power circuit TPIC can supply a touch electrode driving signal TDS which is required for driving the touch electrodes TE to the touch driving circuit TDC.

On the other hand, in view of a driving entity for the touch electrodes TE, the touch driving circuit TDC can supply touch electrode driving signals TDS1 and TDS3 for touch sensing to the touch electrodes TE which are to be sensed among the plurality of touch electrodes TE on the basis of a modulated signal (for example, a pulse width modulated signal) received from the touch controller TCTR. The touch power circuit TPIC can also supply the modulated signal (for example, a pulse width modulated signal) received from the touch controller TCTR as a load-free driving signal (a type of touch electrode driving signal) to the touch electrodes TE which are not to be sensed among the plurality of touch electrodes TE. Here, the touch electrode driving signals TDS1 and TDS2 applied to the touch electrodes TE which are to be sensed and the load-free driving signal (which can be also considered to be a touch electrode driving signal) applied to the touch electrodes TE which are not to be sensed may be the same signal.

The power management circuit PMIC can supply various DC voltages (such as AVDD, Vcom, VGH, and VGL) required for supply of signals from the touch power circuit TPIC to the touch power circuit TPIC.

The power management circuit PMIC can supply various DC voltages (such as AVDD and AVSS) required for data driving in the data driving circuit DDC to the data driving circuit DDC.

The touch controller TCTR can supply pulse width modulated (PWM) signals for outputting or generating various signals (for example, TDS) in circuits such as the touch power circuit TPIC, the touch driving circuit TDC, and the data driving circuit DDC. The touch controller TCTR can be embodied by, for example, a micro control unit (MCU) or a processor.

The touch display device according to the embodiments of the disclosure may further include one or more level shifters L/S that change voltage levels of various signals.

The one or more level shifters L/S may be embodied separately from the data driving circuit DDC, the gate driving circuit GDC, the touch driving circuit TDC, the touch power circuit TPIC, the power management circuit PMIC, the display controller DCTR, and the touch controller TCTR or may be included as one or more internal modules in the data driving circuit DDC, the gate driving circuit GDC, the touch driving circuit TDC, the touch power circuit TPIC, the power management circuit PMIC, the display controller DCTR, and the touch controller TCTR.

Referring to FIG. 10, the data driving circuit DDC may include a gamma block GMA that converts an image digital signal input from the display controller DCTR or the like into an image analog signal.

Referring to FIG. 10, the touch power circuit TPIC is configured to supply a D/A conversion control signal DACS required for converting an image digital signal into an image analog signal to the gamma block GMA in the data driving circuit DDC.

The D/A conversion control signal DACS can include, for example, a gamma reference voltage EGBI_M and may further include a drive voltage AVDD which is a half drive voltage HVDD_M of a middle level between a high-level voltage and a base voltage AVSS which is a low-level voltage.

The gamma reference voltage EGBI_M which is a D/A conversion control signal DACS can include a high gamma reference voltage and a low gamma reference voltage which are input to both ends of a resistor string in the gamma block GMA.

The half drive voltage HVDD_M which is another D/A conversion control signal DACS may be a voltage which is substantially half the drive voltage AVDD.

As described above, the touch driving circuit TDC can output a first touch electrode driving signal TDS1 swinging with the first amplitude AMP1 to the plurality of touch electrodes TE, output a second touch electrode driving signal TDS2 corresponding to a DC voltage to the plurality of touch electrodes TE, or output a third touch electrode driving signal TDS3 swinging with the third amplitude AMPS to all or some of the plurality of touch electrodes TE.

Here, the first touch electrode driving signal TDS1 is a driving signal for touch sensing and corresponds to a common voltage Vcom for display. The second touch electrode driving signal TDS2 corresponds to the common voltage Vcom for display. The third touch electrode driving signal TDS3 corresponds to the driving signal for touch sensing.

In Case 1 in which display driving and touch driving are simultaneously performed, when the first touch electrode driving signal TDS1 is output to the plurality of touch electrodes TE, load-free driving for preventing unnecessary parasitic capacitance from being formed between the plurality of touch electrodes TE and the plurality of data lines DL is required.

For this purpose, the data driving circuit DDC can supply a data signal Vdata for generating the same voltage variation state as the voltage variation state of the touch electrodes TE due to the first touch electrode driving signal TDS1 in the data lines DL to the data lines DL.

For this load-free driving, the data driving circuit DDC can use a gamma modulation technique.

More specifically, the data driving circuit DDC according to the embodiments of the disclosure can convert an image digital signal into an image analog signal in response to the gamma reference voltage EGBI_M of a modulated signal pattern swinging with a predetermined amplitude and output a data signal Vdata corresponding to the converted image analog signal to the data lines DL.

The data driving circuit DDC according to the embodiments of the disclosure includes a digital-analog converter DAC that converts an image digital signal into an image analog signal in response to the gamma reference voltage EGBI_M of a modulated signal pattern swinging with a predetermined amplitude and an output buffer circuit that outputs a data signal Vdata corresponding to the converted image analog signal to the data lines DL.

The gamma reference voltage EGBI_M of a modulated signal pattern may be modulated in synchronization with the first touch electrode driving signal TDS1 which swings with a first amplitude AMP1 and is applied to the touch electrodes TE arranged in the display panel DISP.

The gamma reference voltage EGBI_M of a modulated signal pattern may have a frequency and a phase corresponding to those of the first touch electrode driving signal TDS1. In some cases, the gamma reference voltage EGBI_M may have an amplitude equal or similar to the first amplitude AMP1 of the first touch electrode driving signal TDS1.

The data signal Vdata which is generated on the basis of the gamma reference voltage EGBI_M of a modulated signal pattern may include a voltage variation part corresponding to the voltage variation of the first touch electrode driving signal TDS1.

For the gamma modulation technique of the data driving circuit DDC, the touch power circuit TPIC can output the gamma reference voltage EGBI_M having an amplitude corresponding to the first amplitude AMP1 of the first touch electrode driving signal TDS1 to the data driving circuit DDC at the driving timing corresponding to Case 1.

At the driving timing corresponding to Case 2, the touch power circuit TPIC can output the gamma reference voltage EGBI_M corresponding to a DC voltage to the data driving circuit DDC.

At the driving timing corresponding to Case 3, the touch power circuit TPIC does not supply any gamma reference voltage EGBI_M of any pattern to the data driving circuit DDC.

Referring to FIG. 10, in the touch display device according to the embodiments of the disclosure, the display panel DISP, the data driving circuit DDC, the gate driving circuit GDC, the touch driving circuit TDC, and the like can be connected to a DC ground voltage GND.

Figure 11:
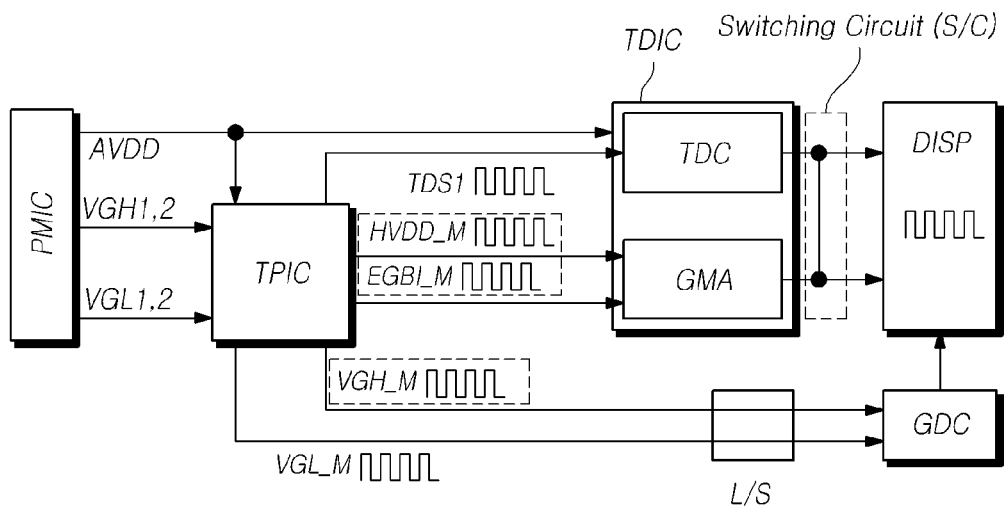
FIG. 11 is a diagram illustrating a signal transmission system between elements for Case 1 of three cases of time-free driving in the touch display device according to the embodiments of the disclosure.
Figure 12:
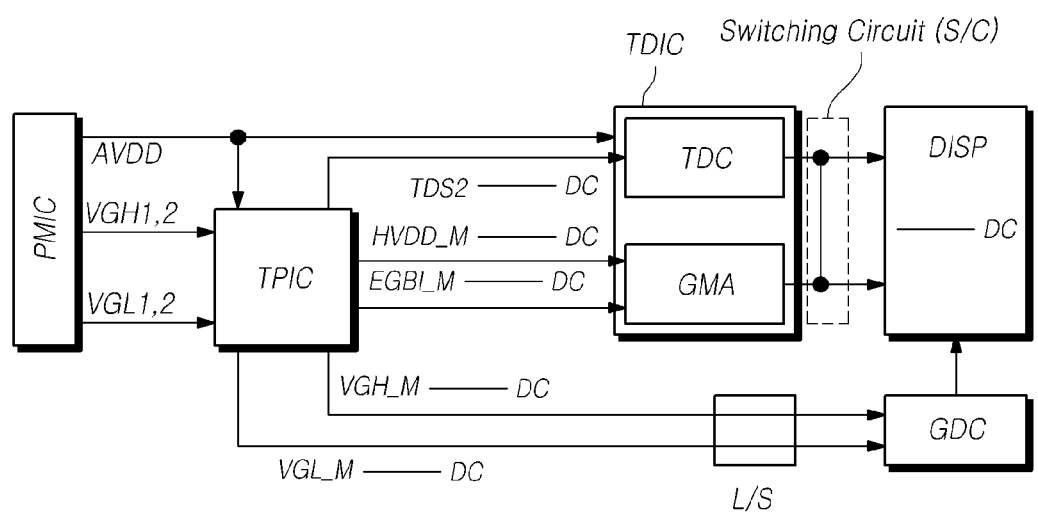
FIG. 12 is a diagram illustrating a signal transmission system between elements for Case 2 of three cases of time-free driving in the touch display device according to the embodiments of the disclosure.
Figure 13:
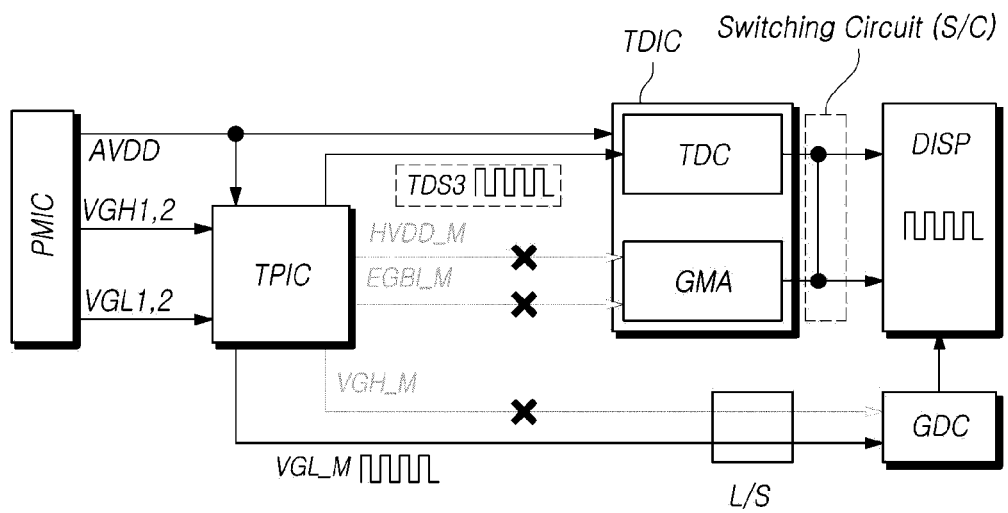
FIG. 13 is a diagram illustrating a signal transmission system between elements for Case 3 of three cases of time-free driving in the touch display device according to the embodiments of the disclosure.

FIGS. 11 to 13 are diagrams illustrating a signal transmission system between elements for the three cases of time-free driving in the touch display device according to the embodiments of the invention. Here, it is assumed that the touch driving circuit TDC and the data driving circuit DDC are integrated as a single driving circuit TDIC.

Referring to FIGS. 11 to 13, the touch power circuit TPIC receives a drive voltage AVDD which is a DC voltage, ON-level gate voltages VGH1 and VGH2, OFF-level gate voltages VGL1 and VGL2 from the power management circuit PMIC.

Referring to FIG. 11, when display driving and touch driving are simultaneously performed in the active time (Case 1), the touch power circuit TPIC can supply the first touch electrode driving signal TDS1 having the first amplitude AMP1 to the data driving circuit DDC.

The touch power circuit TPIC can supply the half drive voltage HVDD_M and the gamma reference voltage EGBI_M which swing in synchronization with the first touch electrode driving signal TDS1 to the gamma block GMA of the data driving circuit DDC. Here, the half drive voltage HVDD_M and the gamma reference voltage EGBI_M may have a frequency and a phase corresponding to those of the first touch electrode driving signal TDS1.

The touch power circuit TPIC can supply an ON-level gate voltage VGH_M and an OFF-level gate voltage VGL_M which swing in synchronization with the first touch electrode driving signal TDS1 to the gate driving circuit GDC. Here, the ON-level gate voltage VGH_M and the OFF-level gate voltage VGL_M may have a frequency and a phase corresponding to those of the first touch electrode driving signal TDS1.

The touch power circuit TPIC can change the ON-level gate voltage VGH_M and the OFF-level gate voltage VGL_M via the level shifter L/S and supply the changed voltages to the gate driving circuit GDC. The level shifter L/S may be disposed in the gate driving circuit GDC.

The touch driving circuit TDC can output the first touch electrode driving signal TDS1 having the first amplitude AMP1 to the plurality of touch electrodes TE.

Here, the first touch electrode driving signal TDS1 serves as a driving signal for touch sensing and also serves as a common voltage Vcom for display.

The data driving circuit DDC can convert an image digital signal into an image analog signal in response to the gamma reference voltage EGBI_M having a frequency and a phase corresponding to those of the first touch electrode driving signal TDS1 and output a data signal Vdata corresponding to the converted image analog signal to the data lines DL.

When the first touch electrode driving signal TDS1 is output to the plurality of touch electrodes TE, the gate driving circuit GDC can supply a first OFF-level gate voltage VGL_M having a frequency and a phase corresponding to those of the first touch electrode driving signal TDS1 or supply a first ON-level gate voltage VGH_M which is offset by the first OFF-level gate voltage VGL_M to the gate lines GL.

In Case 1, the display panel DISP may have characteristics that a voltage swings.

Referring to FIG. 12, when only display driving is performed in the active time (Case 2), the touch power circuit TPIC can supply a second touch electrode driving signal TDS2 corresponding to a DC voltage to the touch driving circuit TDC.

The touch power circuit TPIC can supply the half drive voltage HVDD_M of a DC voltage pattern and the gamma reference voltage EGBI_M of a DC voltage pattern to the gamma block GMA of the data driving circuit DDC.

The touch power circuit TPIC can supply the ON-level gate voltage VGH_M and the OFF-level gate voltage VGL_M of a DC voltage pattern to the gate driving circuit GDC.

The touch power circuit TPIC can change the voltage levels of the ON-level gate voltage VGH_M and the OFF-level gate voltage VGL_M of a DC voltage pattern via a level shifter L/S and supply the changed voltages to the gate driving circuit GDC. The level shifter L/S may be disposed in the gate driving circuit GDC.

The touch driving circuit TDC can supply the second touch electrode driving signal TDS2 of a DC voltage pattern to the plurality of touch electrodes TE.

Here, the second touch electrode driving signal TDS2 of a DC voltage pattern supplied to the plurality of touch electrodes TE may serve as a common voltage for display driving. Accordingly, the plurality of touch electrodes TE may serve as a common electrode.

The data driving circuit DDC can convert an image digital signal into an image analog signal in response to the gamma reference voltage EGBI_M and the half drive voltage HVDD_M corresponding to a DC voltage and output a data signal Vdata corresponding to the converted image analog signal to the data lines DL.

When the second touch electrode driving signal TDS2 is output to the plurality of touch electrodes TE, the gate driving circuit GDC can supply a second OFF-level gate voltage VGL_M which is a DC voltage to the gate lines GL or supply a second ON-level gate voltage VGH_M which is a DC voltage to the gate lines GL.

In Case 2, the display panel DISP can have DC voltage characteristics.

Referring to FIG. 13, when touch driving is performed in the blank time (Case 3), the touch power circuit TPIC can supply a third touch electrode driving signal TDS3 having the third amplitude AMPS to the touch driving circuit TDC.

Since display driving is not required in the blank time, the touch power circuit TPIC does not supply the half drive voltage HVDD_M and the gamma reference voltage EGBI_M to the gamma block GMA of the data driving circuit DDC. That is, since touch driving is performed but display driving is not performed in the blank time in Case 3 of time-free driving, the gamma reference voltage EGBI_M is not input to the data driving circuit DDC.

The touch power circuit TPIC can supply an OFF-level gate voltage VGL_M swinging in synchronization with the third touch electrode driving signal TDS3 to the gate driving circuit GDC. Here, the OFF-level gate voltage VGL_M has a frequency and a phase corresponding to those of the third touch electrode driving signal TDS3.

Since display driving is not required in the blank time, the touch power circuit TPIC does not output the ON-level gate voltage VGH_M swinging in synchronization with the third touch electrode driving signal TDS3.

The touch power circuit TPIC can change a voltage level of the OFF-level gate voltage VGL_M via a level shifter L/S and supply the changed voltage to the gate driving circuit GDC. The level shifter L/S may be disposed in the gate driving circuit GDC.

In the blank time, the touch driving circuit TDC can output a third touch electrode driving signal TDS3 having a third amplitude AMP3 different from the first amplitude AMP1 to all or some of the plurality of touch electrodes TE.

Here, the third touch electrode driving signal TDS3 does not serve as a common voltage for display, but serves as a driving signal for touch sensing.

The third touch electrode driving signal TDS3 which is output from the touch driving circuit TDC can be applied to all or some of the plurality of touch electrodes TE and also be applied to other electrodes (for example, other touch electrodes) or other lines (DL, GL) which are arranged in the display panel DISP for the purpose of load-free driving by a switching circuit S/C.

More specifically, in the blank time, the third touch electrode driving signal TDS3 or a signal corresponding to the third touch electrode driving signal TDS3 can be applied to all or some of the plurality of data lines DL. Here, the third touch electrode driving signal TDS3 or the signal corresponding to the third touch electrode driving signal TDS3 which is applied to all or some of the plurality of data lines DL is a load-free driving signal that can prevent parasitic capacitance from being formed between the corresponding touch electrode TE and the corresponding data line DL and remove a load (an RC delay) in the corresponding touch electrode TE and the corresponding touch line TL.

When the third touch electrode driving signal TDS3 is supplied to the plurality of touch electrodes TE, the gate driving circuit GDC can supply a third OFF-level gate voltage VGL_M having a frequency and a phase corresponding to those of the third touch electrode driving signal TDS3 to the gate lines GL.

In the blank time, the third touch electrode driving signal TDS3 or the signal (the third OFF-level gate voltage)

corresponding to the third touch electrode driving signal TDS3 can be applied to all or some of the plurality of gate lines GL.

Here, the third touch electrode driving signal TDS3 or the signal corresponding to the third touch electrode driving signal TDS3 which is applied to all or some of the plurality of gate lines GL is a load-free driving signal that can prevent parasitic capacitance from being formed between the corresponding touch electrode TE and the corresponding gate line GL and remove a load (an RC delay) in the corresponding touch electrode TE and the corresponding touch line TL.

In Case 3, the display panel DISP can have characteristics that a voltage swings.

Case 1 in which display driving and touch driving are simultaneously performed among three cases of time-free driving (Case 1, Case 2, and Case 3) will be described below in more detail.

Figure 14:
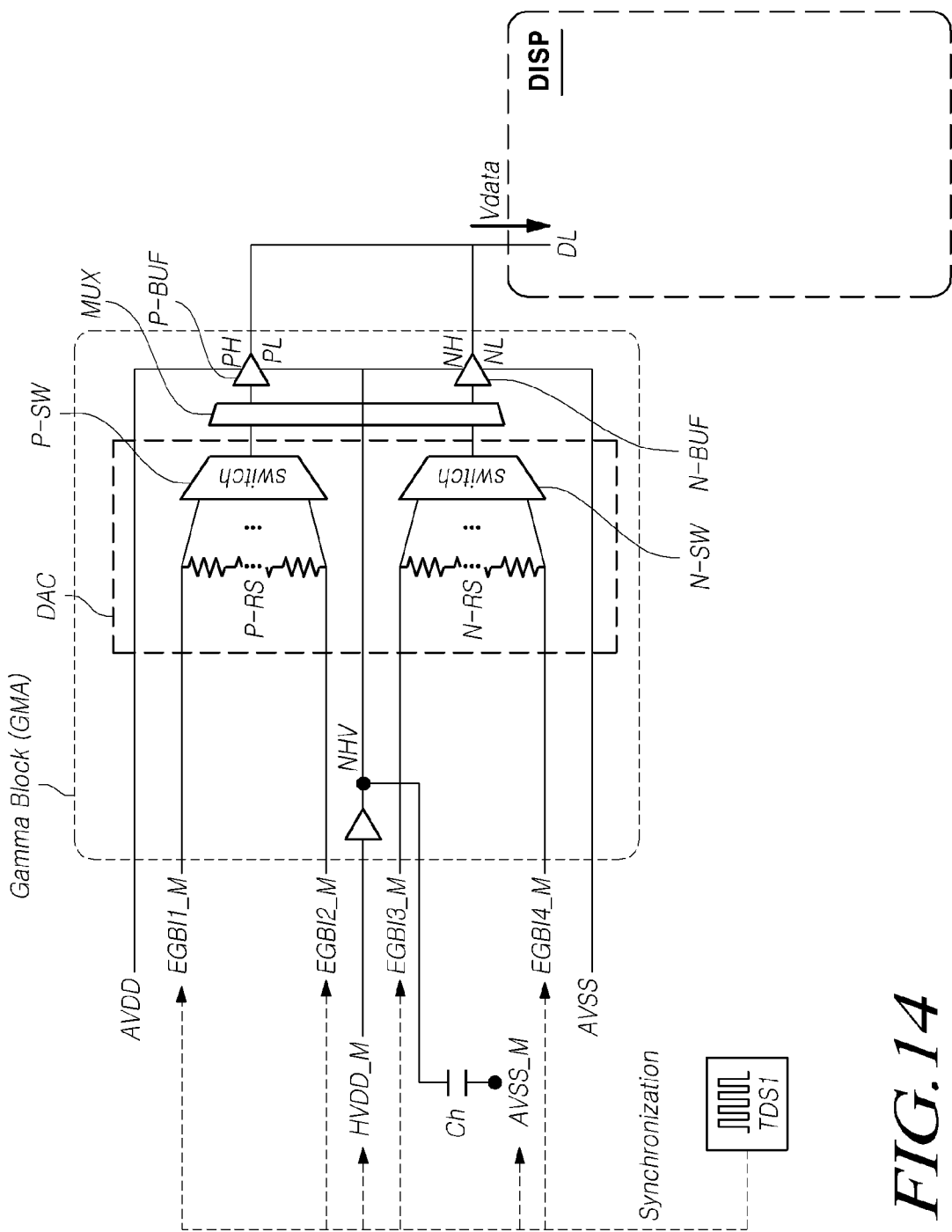
FIG. 14 is a diagram illustrating an example of a gamma block for performing time-free driving on data lines using a gamma modulation method in the time-free driving system of the touch display device according to the embodiments of the disclosure.
Figure 15:
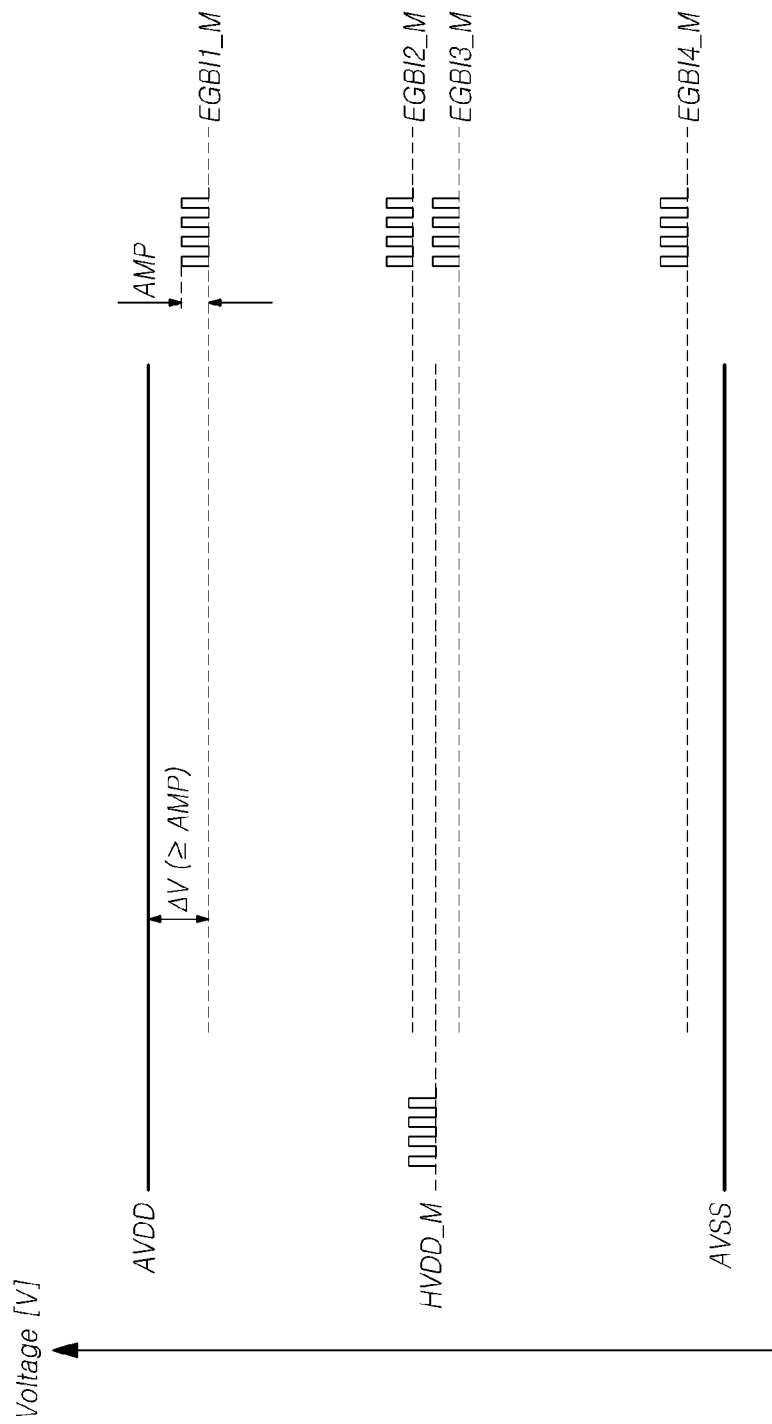
FIG. 15 is a diagram illustrating voltage levels and characteristics of gamma reference voltages which are used in a gamma block for performing time-free driving on data lines using a gamma modulation method in the time-free driving system of the touch display device according to the embodiments of the disclosure.

FIG. 14 is a diagram illustrating an example of a gamma block GMA for performing time-free driving TFD on the data lines DL using the gamma modulation technique in the time-free driving (TFD) system of the touch display device according to the embodiments of the disclosure. FIG. 15 is a diagram illustrating voltage levels and characteristics of the gamma reference voltages EGBI1_M, EGBI2_M, EGBI3_M, and EGBI4_M which are used in the gamma block GMA for performing time-free driving on the data lines DL using the gamma modulation technique in the time-free driving system of the touch display device according to the embodiments of the disclosure.

In the following description, it is assumed that the data lines DL are driven on the basis of polarity inversion driving.

The gamma block GMA in the data driving circuit DDC according to the embodiments of the disclosure can include a digital-to-analog converter DAC that converts an image digital signal to an image analog signal having a positive polarity or a negative polarity using the gamma reference voltages EGB1_M, EGBI2_M, EGBI3_M, and EGBI4_M.

The digital-to-analog converter DAC includes a first conversion part (a positive conversion part) and a second conversion part (a negative conversion part).

The first conversion part of the digital-to-analog converter DAC includes a first resistor string P-RS in which a plurality of resistors are connected in series and a first switch P-SW that selects an image analog voltage having a positive polarity on the basis of an image digital signal. The second conversion part of the digital-to-analog converter DAC includes a second resistor string N-RS in which a plurality of resistors are connected in series and a second switch N-SW that selects an image analog voltage having a negative polarity on the basis of an image digital signal.

The gamma block GMA in the data driving circuit DDC according to the embodiments of the disclosure can further include a multiplexer MUX that selects an image analog voltage having a positive polarity and an image analog voltage having a negative polarity, a first output buffer circuit P-BUF that outputs a first data signal Vdata corresponding to the image analog signal having a positive polarity to the data lines DL, and a second output buffer circuit N-BUF that outputs a second data signal Vdata corresponding to the image analog signal having a negative polarity to the data lines DL.

Referring to FIGS. 14 and 15, when the data driving circuit DDC performs polarity inversion driving, the gamma reference voltage EGBI_M of a modulated signal pattern can include a first gamma reference voltage EGBI1_M and a second gamma reference voltage EGBI2_M which are applied to both ends of the resistor string having a positive polarity P-RS and include a third gamma reference voltage EGBI3_M and a fourth gamma reference voltage EGBI4_M which are applied to both ends of the resistor string having a negative polarity N-RS.

The four gamma reference voltages EGBI1_M, EGBI2_M, EGBI3_M, and EGBI4_M may be signals which are generated by modulating the frequency and the phase of the first touch electrode driving signal TDS1 in synchronization.

Each of the four gamma reference voltages EGBI1_M, EGBI2_M, EGBI3_M, and EGBI4_M is a variable voltage and can have an amplitude equal or similar to the first amplitude AMP1 of the first touch electrode driving signal TDS1.

In other words, the digital-to-analog converter DAC in the data driving circuit DDC can receive the first gamma reference voltage EGBI1_M, the second gamma reference voltage EGBI2_M, the third gamma reference voltage EGBI3_M, and the fourth gamma reference voltage EGBI4_M having a frequency and a phase corresponding to those of the first touch electrode driving signal TDS1 and convert an image digital signal into a first image analog signal (an image analog signal having a positive polarity) in response to the first gamma reference voltage EGBI1_M and the second gamma reference voltage EGBI2_M or convert an image digital signal into a second image analog signal (an image analog signal having a negative polarity) in response to the third gamma reference voltage EGBI3_M and the fourth gamma reference voltage EGBI4_M.

The first output buffer circuit P-BUF can receive the first image analog signal and output a first data signal Vdata to the data lines DL.

The second output buffer circuit N-BUF can receive the second image analog signal and output a second data signal Vdata to the data lines DL.

The first data signal Vdata is a data signal Vdata having a positive polarity which is output to the data lines DL in the i-th frame. The second data signal Vdata is a data signal Vdata having a negative polarity which is output to the data lines DL in the (i+1)-th frame.

Referring to FIGS. 14 and 15, the first gamma reference voltage EGBI1_M is a positive-high gamma reference voltage, the second gamma reference voltage EGBI2_M is a positive-low gamma reference voltage, the third gamma reference voltage EGBI3_M is a negative-high gamma reference voltage, and the fourth gamma reference voltage EGBI4_M is a negative-low gamma reference voltage.

The first gamma reference voltage EGBI1_M, the second gamma reference voltage EGBI2_M, the third gamma reference voltage EGBI3_M, and the fourth gamma reference voltage EGBI4_M are modulated signals which swing in synchronization with the first touch electrode driving signal TDS1 and can have a frequency and a phase corresponding to those of the first touch electrode driving signal TDS1.

The first gamma reference voltage EGBI1_M, the second gamma reference voltage EGBI2_M, the third gamma reference voltage EGBI3_M, the fourth gamma reference voltage EGBI4_M can have an amplitude AMP corresponding to the first amplitude AMP1 of the first touch electrode driving signal TDS1.

The first gamma reference voltage EGBI1_M can be set to a voltage higher than the second gamma reference voltage EGBI2_M. The second gamma reference voltage EGBI2_M can be set to a voltage higher than the third gamma reference voltage EGBI3_M. The third gamma reference voltage EGBI3_M can be set to a voltage higher than the fourth gamma reference voltage EGBI4_M.

On the other hand, referring to FIG. 14, the first output buffer circuit P-BUF can operate with the drive voltage AVDD applied to a PH node and the half drive voltage HVDD_M applied to a PL node.

The second output buffer circuit N-BUF can operate with the half drive voltage HVDD_M applied to an NH node and a base voltage AVSS applied to an NL node.

The drive voltage AVDD applied to the first output buffer circuit P-BUF and the half drive voltage HVDD_M applied to the second output buffer circuit N-BUF are voltages that perform the same function (a buffer drive voltage). The half drive voltage HVDD_M applied to the first output buffer circuit P-BUF and the base voltage AVSS applied to the second output buffer circuit N-BUF are voltages that perform the same function (a buffer base voltage).

The drive voltage AVDD may be a DC voltage. The base voltage AVSS may be a DC voltage which is lower than the drive voltage AVDD. For example, the base voltage AVSS may be 0 [V].

The half drive voltage HVDD_M may be a signal of which the voltage swings between the drive voltage AVDD and the base voltage AVSS.

The half drive voltage HVDD_M may be a signal having a frequency and a phase corresponding to those of the first touch electrode driving signal TDS1. Accordingly, the half drive voltage HVDD_M can have a frequency and a phase corresponding to those of the first gamma reference voltage EGBI1_M, the second gamma reference voltage EGBI2_M, the third gamma reference voltage EGBI3_M, and the fourth gamma reference voltage EGBI4_M.

In some cases, the half drive voltage HVDD_M can have an amplitude corresponding to the first amplitude AMP1 of the first touch electrode driving signal TDS1. Accordingly, the half drive voltage HVDD_M can have an amplitude corresponding to those of the first gamma reference voltage EGBI1_M, the second gamma reference voltage EGBI2_M, the third gamma reference voltage EGBI3_M, and the fourth gamma reference voltage EGBI4_M.

The first gamma reference voltage EGBI1_M and the second gamma reference voltage EGBI2_M can be set to voltages which are higher than the half drive voltage HVDD_M. The third gamma reference voltage EGBI3_M and the fourth gamma reference voltage EGBI4_M can be set to voltages which are lower than the half drive voltage HVDD_M.

A low-level voltage of the fourth gamma reference voltage EGBI4_M can be set to be higher than the base voltage AVSS. Particularly, a difference ΔV between the low-level voltage of the first gamma reference voltage EGBI1_M and the drive voltage AVDD can be set to be equal to or greater than the amplitude AMP of the first gamma reference voltage EGBI1_M.

Referring to FIG. 14, a voltage AVSS_M having an amplitude corresponding to the first amplitude AMP1 of the first touch electrode driving signal TDS1 can be applied to an NHV node which is commonly connected to a node (a PL node) at which the half drive voltage HVDD_M is applied to the first output buffer circuit P-BUF and a node (an NH node) at which the half drive voltage HVDD_M is applied to the second output buffer circuit N-BUF via a capacitor Ch.

The half drive voltage HVDD_M serves as a base voltage of a low level for the first output buffer circuit P-BUF and serves as a drive voltage of a high level for the second output buffer circuit N-BUF. In this regard, the capacitor Ch connected to the NHV node can help voltage stabilization of the NHV node and the half drive voltage HVDD_M.

Figure 16:
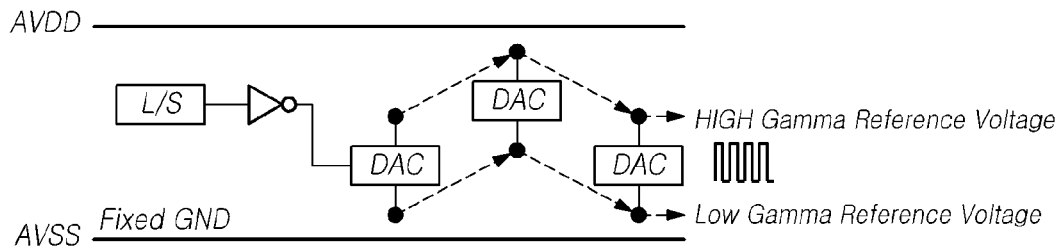
FIG. 16 is a diagram illustrating digital-analog conversion characteristics in a gamma block for performing time-free driving on data lines using a gamma modulation method in the time-free driving system of the touch display device according to the embodiments of the disclosure.

FIG. 16 is a diagram illustrating digital-analog conversion characteristics in the gamma block GMA for performing time-free driving on the data lines DL using the gamma modulation technique in the time-free driving system of the touch display device according to the embodiments of the invention.

Referring to FIG. 16, the digital-to-analog converter DAC causes the first conversion part (the positive conversion part) and the second conversion part (the negative conversion part) to operate alternately.

At the time of digital-analog conversion in the first conversion part (the positive conversion part), a high gamma reference voltage is the first gamma reference voltage EGBI1_M and a low gamma reference voltage is the second gamma reference voltage EGBI2_M.

At the time of digital-analog conversion in the second conversion part (the negative conversion part), a high gamma reference voltage is the third gamma reference voltage EGBI3_M and a low gamma reference voltage is the fourth gamma reference voltage EGBI4_M.

An image analog signal which is output from the digital-to-analog converter DAC can swing between the drive voltage AVDD and the base voltage AVSS. Here, the base voltage AVSS may be a fixed ground voltage GND.

The image analog signal which is output from the digital-to-analog converter DAC is subjected to a large voltage variation due to polarity inversion driving and is also subjected to a minute voltage variation due to a voltage variation in the high gamma reference voltage and the low gamma reference voltage.

Figure 17:
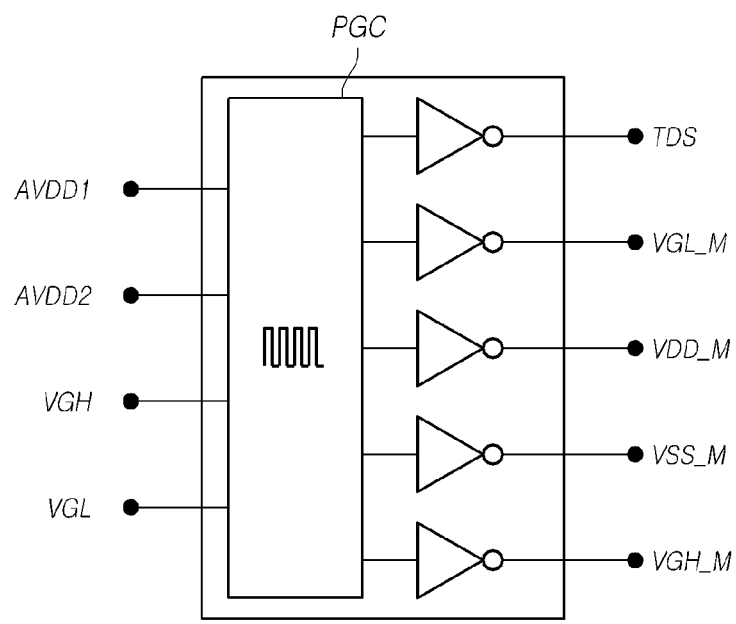
FIG. 17 is a diagram illustrating a load-free driving block in the time-free driving system of the touch display device according to the embodiments of the disclosure.
Figure 18:
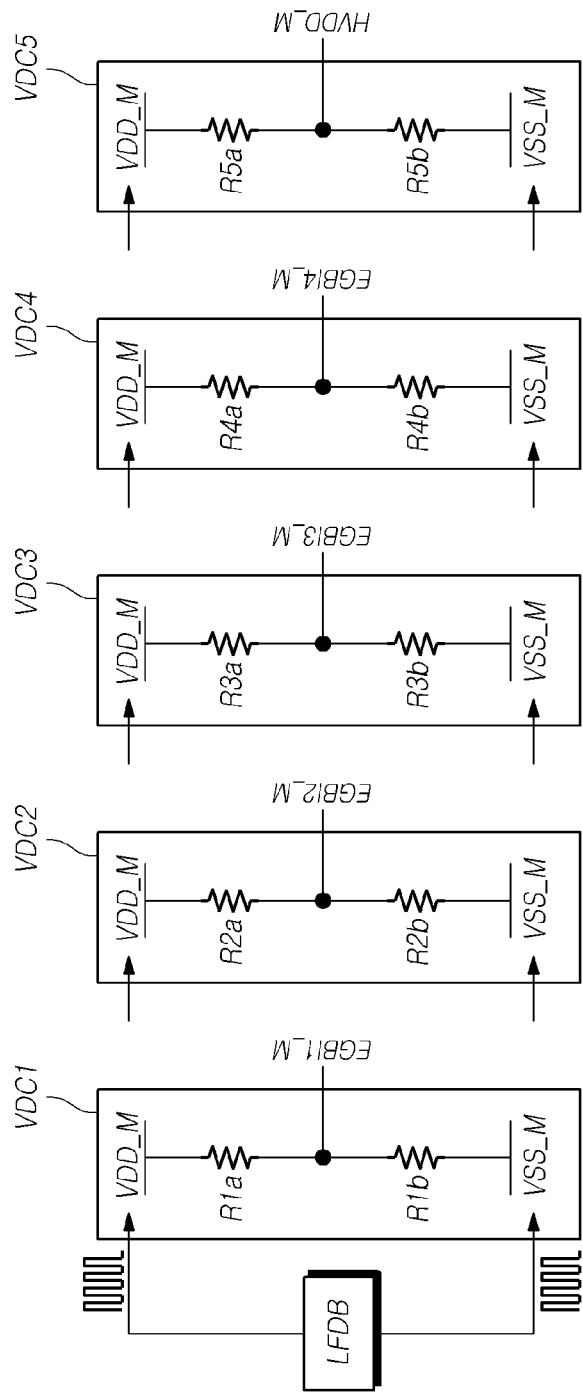
FIG. 18 is a diagram illustrating a circuit for generating various voltages for a gamma modulation method in the time-free driving system of the touch display device according to the embodiments of the disclosure.

FIG. 17 is a diagram illustrating a load-free driving block LFDB in the time-free driving system of the touch display device according to the embodiments of the disclosure. FIG. 18 is a diagram illustrating circuits for generating various voltages EGBI1_M, EGBI2_M, EGBI3_M, EGBI4_M, and HVDD_M for the gamma modulation technique in the time-free driving system of the touch display device according to the embodiments of the disclosure.

Referring to FIG. 17, the touch power circuit TPIC, a printed circuit board on which the touch power circuit TPIC is mounted, and the like can include a load free driving block LFDB.

The load free driving block LFDB receives four or more DC voltages AVDD1, AVDD2, VGH, and VGL. A pulse generation circuit PGC in the load free driving block LFDB generates modulated signals TDS, VGL_M, VGH_M, VDD_M, and VSS_M required for time-free driving and load-free driving using the four or more DC voltages AVDD1, AVDD2, VGH, and VGL.

The modulated signals TDS, VGL_M, VGH_M, VDD_M, and VSS_M which are generated by the pulse generation circuit PGC in the load free driving block LFDB are signals of a variable voltage which swing with a predetermined amplitude and may be pulse signals or AC signals.

Here, when the touch electrode driving signal TDS applied to the touch electrodes TE is the first touch electrode driving signal TDS1 or the third touch electrode driving signal TDS3, the pulse generation circuit PGC can generate the first touch electrode driving signal TDS1 or the third touch electrode driving signal TDS3 of a modulated signal pattern which swings between a voltage AVDD1 and a voltage AVDD2 by setting the voltage AVDD1 as a low-level voltage and setting the voltage AVDD2 as a high-level voltage.

Referring to FIG. 18, the load free driving block LFDB applies the modulated drive voltage VDD_M and the modulated base voltage VSS_M among the generated modulated signals TDS, VGL_M, VGH_M, VDD_M, and VSS_M to both ends of each of first to fifth voltage division circuits VDC1, VDC2, VDC3, VDC4, and VDC5.

The first voltage division circuit VDC1 includes a resistor R1a and a resistor R1b which are connected in series between the modulated drive voltage VDD_M and the modulated base voltage VSS_M and outputs the first gamma reference voltage EGBI1_M to a connection node between the two resistors R1a and R1b.

Here, the first gamma reference voltage EGBI1_M may be a modulated signal of a variable voltage like the modulated drive voltage VDD_M and the modulated base voltage VSS_M, and the voltage level of the first gamma reference voltage EGBI1_M can vary depending on the magnitudes of the resistors R1a and R1b.

The second voltage division circuit VDC2 includes a resistor R2a and a resistor R2b which are connected in series between the modulated drive voltage VDD_M and the modulated base voltage VSS_M and outputs the second gamma reference voltage EGBI2_M to a connection node between the two resistors R2a and R2b.

Here, the second gamma reference voltage EGBI2_M may be a modulated signal of a variable voltage like the modulated drive voltage VDD_M and the modulated base voltage VSS_M, and the voltage level of the second gamma reference voltage EGBI2_M can vary depending on the magnitudes of the resistors R2a and R2b.

The third voltage division circuit VDC3 includes a resistor R3a and a resistor R3b which are connected in series between the modulated drive voltage VDD_M and the modulated base voltage VSS_M and outputs the third gamma reference voltage EGBI3_M to a connection node between the two resistors R3a and R3b.

Here, the third gamma reference voltage EGBI3_M may be a modulated signal of a variable voltage like the modulated drive voltage VDD_M and the modulated base voltage VSS_M, and the voltage level of the third gamma reference voltage EGBI3_M can vary depending on the magnitudes of the resistors R3a and R3b.

The fourth voltage division circuit VDC4 includes a resistor R4a and a resistor R4b which are connected in series between the modulated drive voltage VDD_M and the modulated base voltage VSS_M and outputs the fourth gamma reference voltage EGBI4_M to a connection node between the two resistors R4a and R4b.

Here, the fourth gamma reference voltage EGBI4_M may be a modulated signal of a variable voltage like the modulated drive voltage VDD_M and the modulated base voltage VSS_M, and the voltage level of the fourth gamma reference voltage EGBI4_M can vary depending on the magnitudes of the resistors R4a and R4b.

The first to fifth voltage division circuits VDC1, VDC2, VDC3, VDC4, and VDC5 may be disposed in the touch power circuit TPIC or may be mounted on a printed circuit board. Here, the touch power circuit TPIC can be mounted on the printed circuit board.

Figure 19:
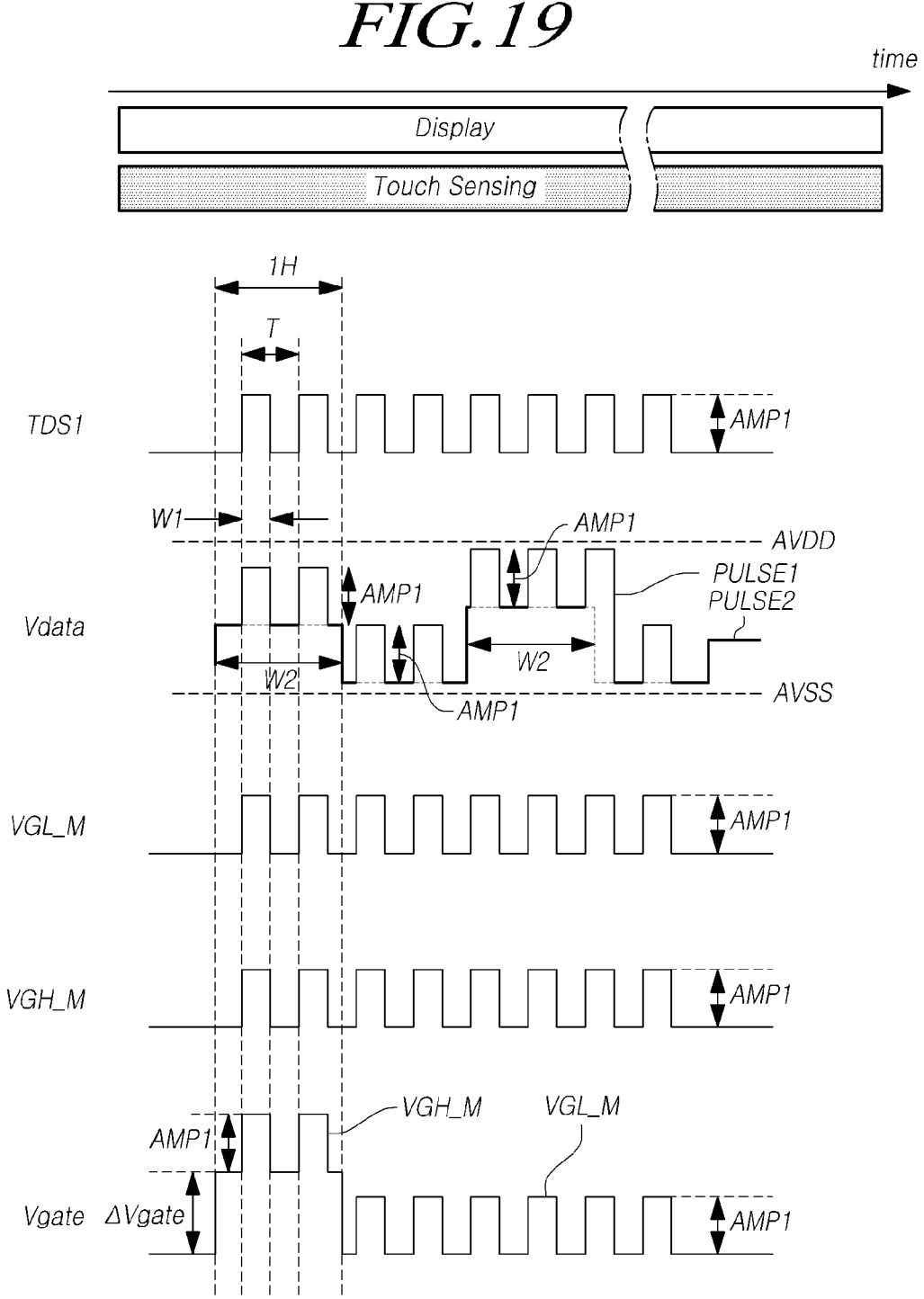
FIG. 19 is a diagram illustrating waveforms of principal signals for time-free driving when a frequency of a touch electrode driving signal is fast in the touch display device according to the embodiments of the disclosure.
Figure 20:
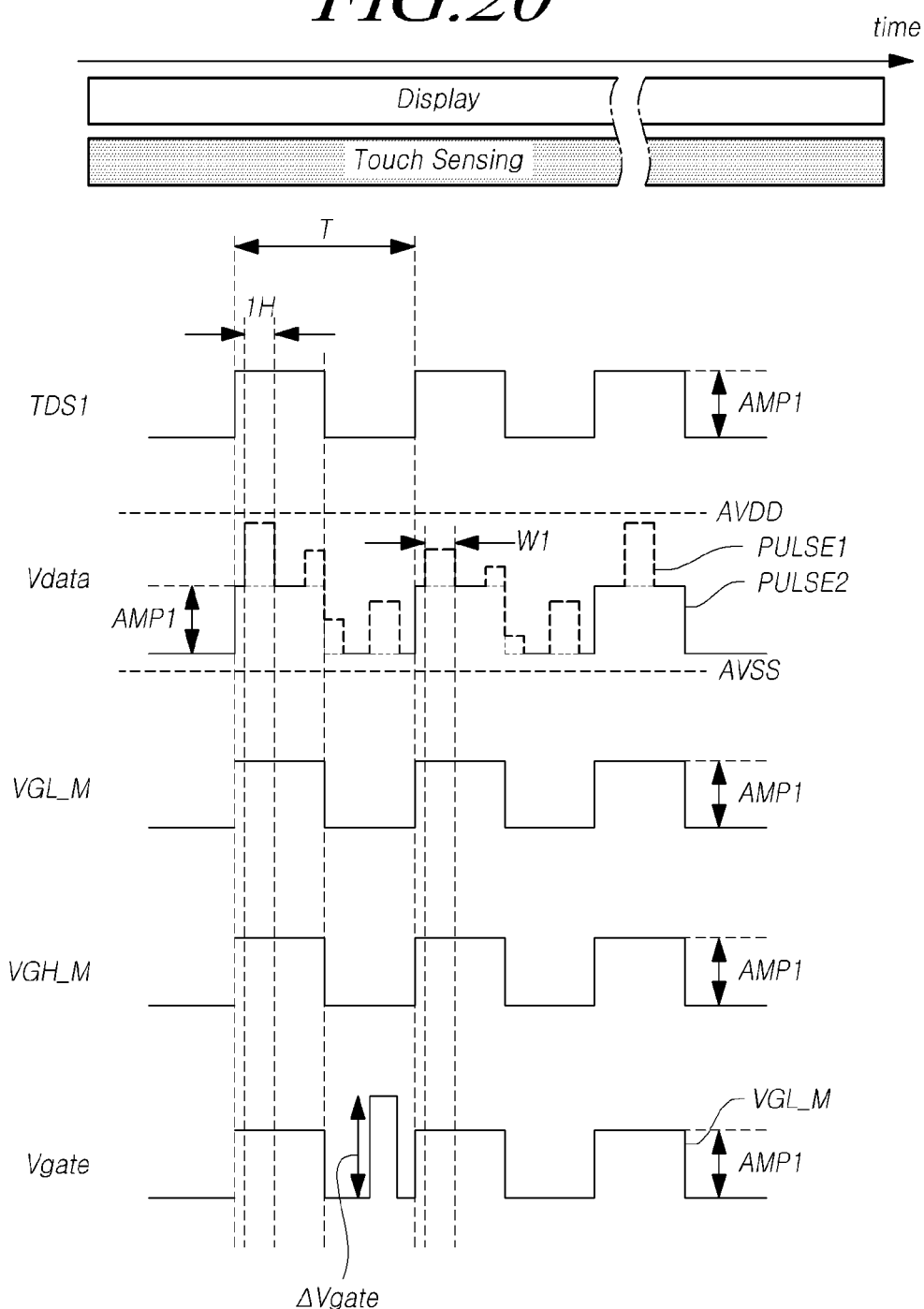
FIG. 20 is a diagram illustrating waveforms of principal signals for time-free driving when a frequency of a touch electrode driving signal is slow in the touch display device according to the embodiments of the disclosure.

FIG. 19 is a diagram illustrating waveforms of principal signals TDS1, Vdata, VGL_M, VGH_M, and Vgate for time-free driving when the frequency of the first touch electrode driving signal TDS1 is fast in the touch display device according to the embodiments of the disclosure. FIG. 20 is a diagram illustrating waveforms of principal signals TDS1, Vdata, VGL_M, VGH_M, and Vgate for time-free driving when the frequency of the first touch electrode driving signal TDS1 is slow in the touch display device according to the embodiments of the disclosure.

The frequency of the first touch electrode driving signal TDS1 may be set to be fast or may be set to be slow. That is, the period T of the first touch electrode driving signal TDS1 may be set to be short or may be set to be long.

As illustrated in FIG. 19, the period T of the first touch electrode driving signal TDS1 may be shorter than a predetermined horizontal time. As illustrated in FIG. 20, the period T of the first touch electrode driving signal TDS1 may be longer than the predetermined horizontal time.

Here, the predetermined horizontal time may be 1H, 2H, 3H, or the like. In the following description, it is assumed that the predetermined horizontal time is 1H.

Referring to FIGS. 19 and 20, when display driving and touch driving are simultaneously performed in the time-free driving system, the data signal Vdata may have a signal pattern in which first pulses PULSE1 having a first pulse width W1 and second pulses PULSE2 having a second pulse width W2 are combined. Here, the second pulse width W2 is greater than the first pulse width W1.

Referring to FIGS. 19 and 20, the voltage of the data signal Vdata can vary between the drive voltage AVDD and the base voltage AVSS.

As illustrated in FIG. 19, when the period T of the first touch electrode driving signal TDS1 is shorter than predetermined horizontal time (for example, 1H), the first pulses PULSE1 in the data signal Vdata may have a part having an amplitude corresponding to the first amplitude AMP1 of the first touch electrode driving signal TDS1. The first pulse width W1 of the first pulses PULSE1 corresponds to the pulse width of the first touch electrode driving signal TDS1.

As illustrated in FIG. 20, when the period T of the first touch electrode driving signal TDS1 is longer than the predetermined horizontal time (for example, 1H), the second pulses PULSE2 in the data signal Vdata may have a part having an amplitude corresponding to the first amplitude AMP1 of the first touch electrode driving signal TDS1. The second pulse width W2 of the second pulses PULSE2 corresponds to the pulse width of the first touch electrode driving signal TDS1.

Referring to FIGS. 19 and 20, the OFF-level gate voltage VGL_M which is supplied from the touch power circuit TPIC to the gate driving circuit GDC has a frequency and a phase corresponding to those of the first touch electrode driving signal TDS1. The ON-level gate voltage VGH_M which is supplied from the touch power circuit TPIC to the gate driving circuit GDC has a frequency and a phase corresponding to those of the first touch electrode driving signal TDS1.

Referring to FIGS. 19 and 20, the OFF-level gate voltage VGL_M and the ON-level gate voltage VGH_M may have the same amplitude as the first amplitude AMP1 of the first touch electrode driving signal TDS or substantially the same amplitude within an allowable range.

Referring to FIG. 19, the scan signal Vgate which is applied to the gate lines GL has the OFF-level gate voltage VGL_M in a period other than the horizontal time (1H) in which the corresponding gate line GL is open, and has the ON-level gate voltage VGH_M in the horizontal time (1H) in which the corresponding gate line GL is open, and may have a pattern in which a voltage (ΔVgate) corresponding to the amplitude required for opening the corresponding gate line GL and the ON-level gate voltage VGH_M are added. Here, the voltage (≠Vgate) corresponding to the amplitude required for opening the corresponding gate line GL may be a voltage difference between a high-level gate voltage VGH and a low-level gate voltage VGL of a DC voltage pattern.

Referring to FIG. 19, the scan signal Vgate which is applied to the gate lines GL has a pattern in which the OFF-level gate voltage VGL_M of a modulated signal pattern is superimposed on the ON-level gate voltage VGH_M in the horizontal time (1H) in which the corresponding gate line GL is open, and has the pattern of the OFF-level gate voltage VGL_M of a modulate signal pattern in a time other than the horizontal time (1H). Here, the OFF-level gate voltage VGL_M of a modulated signal pattern has a frequency and a phase corresponding to those of the first touch electrode driving signal TDS1.

Referring to FIG. 20, the scan signal Vgate which is applied to the gate lines GL has a pattern in which the voltage ΔVgate corresponding to the amplitude required for opening the corresponding gate line GL is superimposed on the OFF-level gate voltage VGL_M of a modulated signal pattern in the horizontal time (1H) in which the corresponding gate line GL is open, and has a pattern of the OFF-level gate voltage VGL_M of a modulate signal pattern in a time other than the horizontal time (1H). Here, the OFF-level gate voltage VGL_M of a modulated signal pattern has a frequency and a phase corresponding to those of the first touch electrode driving signal TDS1.

Figure 21:
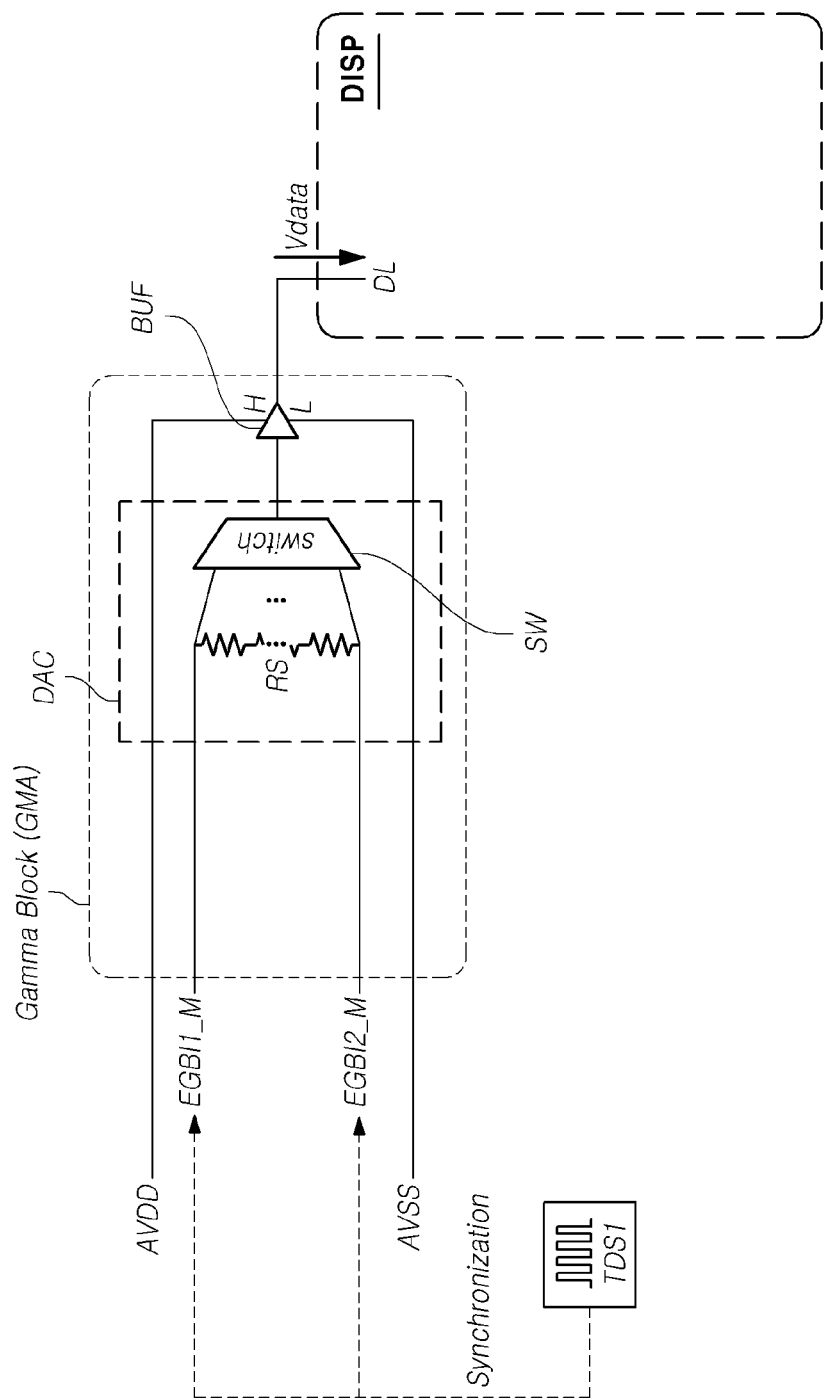
FIG. 21 is a diagram illustrating another example of the gamma block for performing time-free driving on data lines using a gamma modulation method in the time-free driving system of the touch display device according to the embodiments of the disclosure.

FIG. 21 is a diagram illustrating another example of the gamma block GMA for performing time-free driving on data lines using the gamma modulation technique in the time-free driving system of the touch display device according to the embodiments of the disclosure.

Referring to FIG. 21, when polarity inversion driving is not performed at the time of data driving, the gamma block GMA in the data driving circuit DDC can include a digital-to-analog converter DAC that receives an image digital signal, receives the first gamma reference voltage EGBI1_M and the second gamma reference voltage EGBI2_M having a frequency and a phase corresponding to those of the first touch electrode driving signal TDS1, and converts the image digital signal into an image analog signal in response to the first gamma reference voltage EGBI1_M and the second gamma reference voltage EGBI2_M and an output buffer circuit BUF that receives the image analog signal and outputs the data signal Vdata to the data lines DL.

The digital-to-analog converter DAC includes a resistor string RS and a switch SW.

The output buffer circuit BUF can operate when the drive voltage AVDD and the base voltage AVSS are applied to an H node and an L node, respectively.

The first gamma reference voltage EGBI1_M can be set to a voltage higher than the second gamma reference voltage EGBI2_M.

The low-level voltage of the second gamma reference voltage EGBI2_M can be set to be higher than the base voltage AVSS.

A difference between the low-level voltage of the first gamma reference voltage EGBI1_M and the drive voltage AVDD can be set to be equal to or greater than the amplitude of the first gamma reference voltage EGBI1_M.

Figure 22:
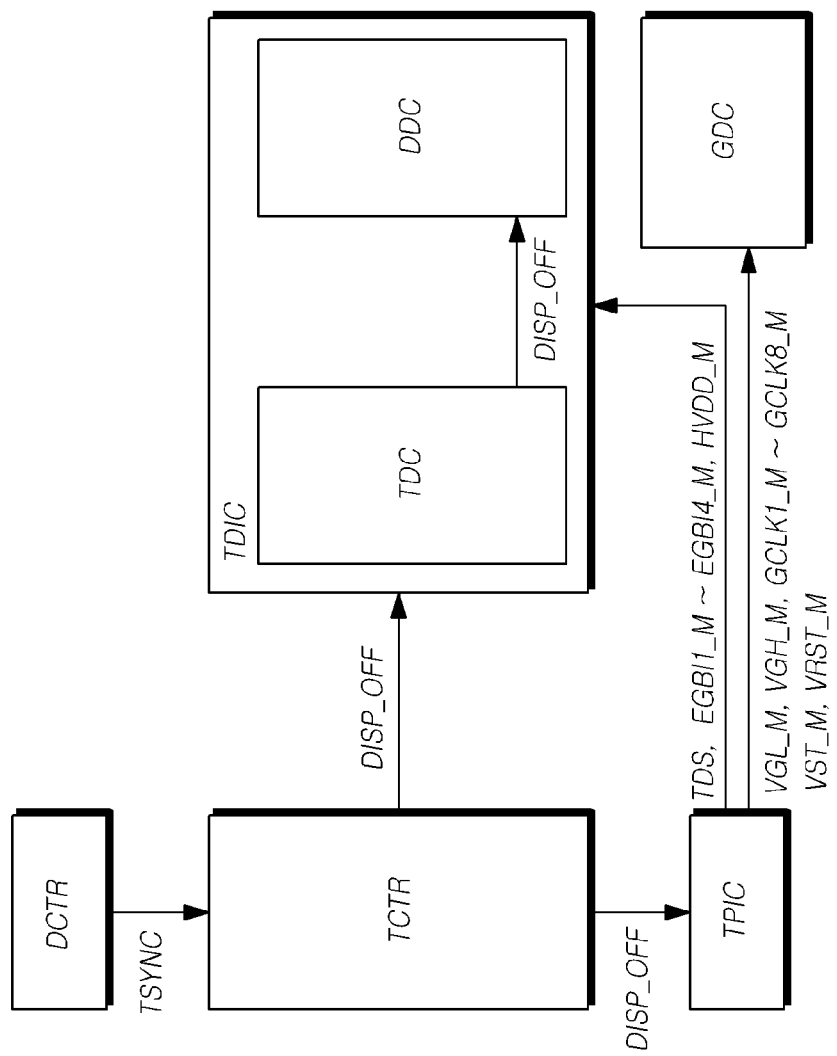
FIG. 22 is a diagram illustrating principal control signals for time-free driving in the touch display device according to the embodiments of the disclosure.

FIG. 22 is a diagram illustrating principal control signals for three cases of time-free driving in the touch display device according to the embodiments of the disclosure. Here, it is assumed that the touch driving circuit TDC and the data driving circuit DDC are embodied to be integrated as a single driving integrated circuit TDIC.

Referring to FIG. 22, as described above, for the time-free driving, the touch power circuit TPIC can supply a touch electrode driving signal TDS to the touch driving circuit TDC and supply the gamma reference voltages EGBI1_M, EGBI2_M, EGBI3_M, and EGBI4_M and the half drive voltage HVDD_M to the data driving circuit DDC.

The touch power circuit TPIC can supply the ON-level gate voltage VGH_M and the OFF-level gate voltage VGL_M to the gate driving circuit GDC.

On the other hand, as illustrated in FIG. 22, the touch power circuit TPIC can additionally supply signals required for gate driving such as two or more gate clock signals (for example, GCLK1_M to GCLK8_M), one or more start signal (VST_M), and one or more reset signal (VRST_M) to the gate driving circuit GDC.

The signals required for gate driving such as the gate clock signals GCLK1_M to GCLK8_M, the start signal VST_M, and the reset signal VRST_M may be modulated signal (pulse signals) which are generated to correspond to the touch electrode driving signal TDS or signals including such modulated signal (pulse signals). "Corresponding to the touch electrode driving signal TDS" means that the frequency and the phase are the same or substantially the same within an allowable range and means that the amplitude is the same or substantially the same within an allowable range according to one embodiment.

Referring to FIG. 22, the display controller DCTR can supply a synchronization signal TSYNC indicating a timing for display driving and a timing for touch driving to the touch controller TCTR.

The touch controller TCTR supplies a display-off control signal DISP_OFF indicating display-off to the touch power circuit TPIC and the driving integrated circuit TDIC.

The display-off control signal DISP_OFF supplied to the driving integrated circuit TDIC can be supplied to the data driving circuit DDC to stop display driving.

Figure 23:
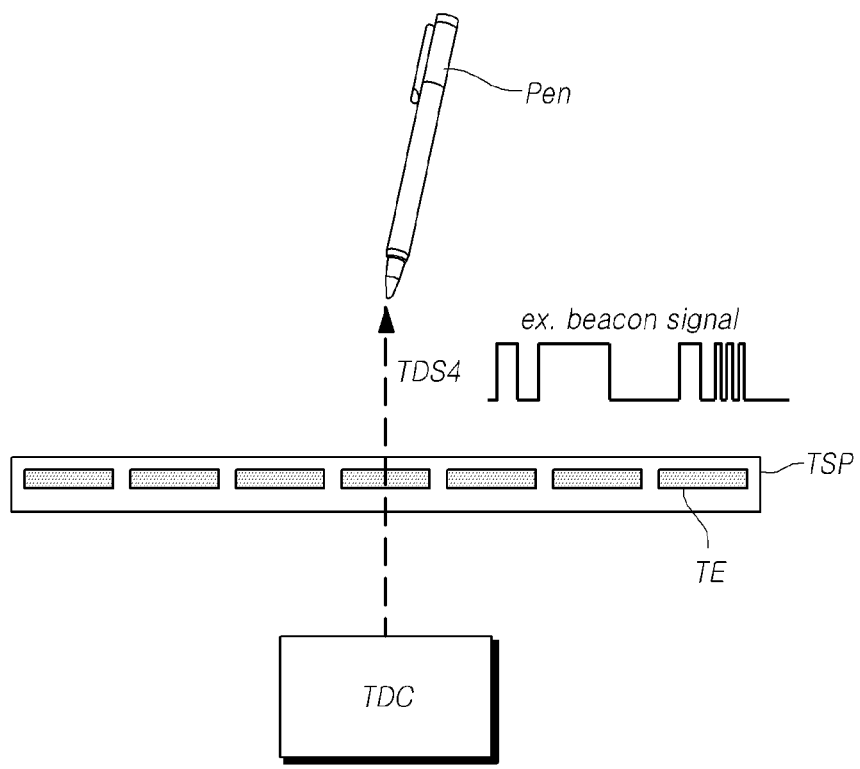
FIGS. 23 and 24 are diagrams illustrating a pen sensing operation in the touch display device according to the embodiments of the disclosure.
Figure 24:
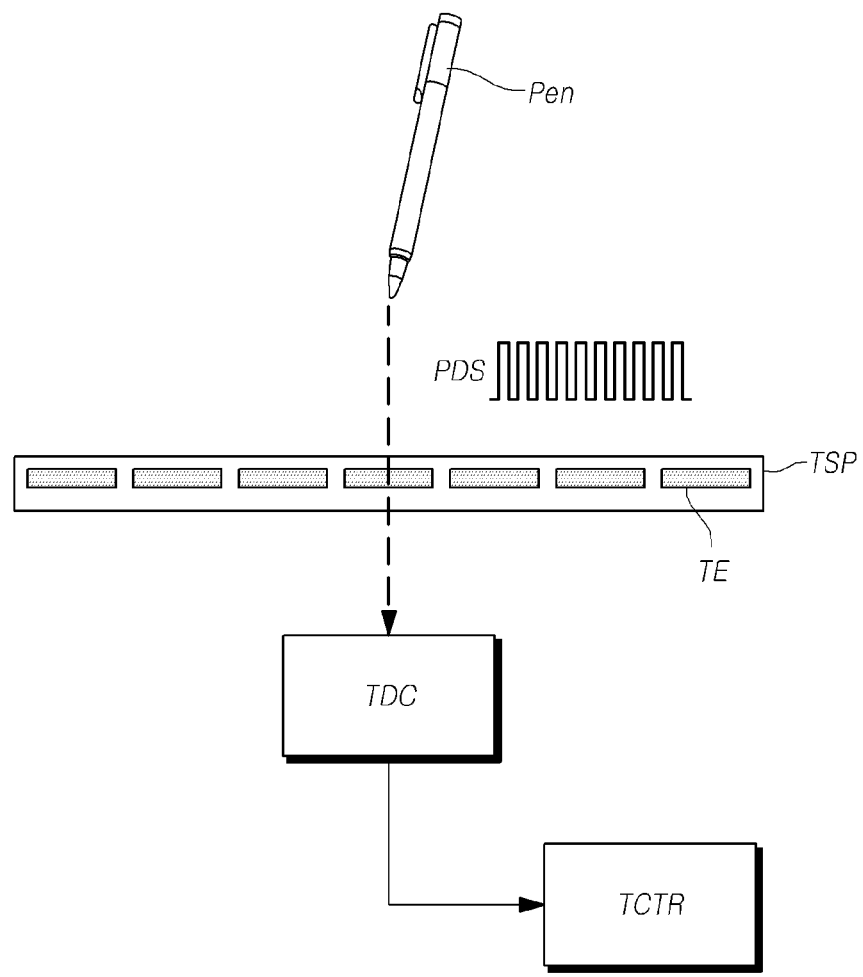

FIGS. 23 and 24 are diagrams illustrating a pen sensing operation in the touch display device according to the embodiments of the disclosure.

Display driving is not performed in the blank time.

For the purpose of touch driving for finger sensing, in the blank time, the touch driving circuit TDC can supply the third touch electrode driving signal TDS3 of a regular pulse signal pattern in which the pulse width is regular to the touch electrodes TE.

In some cases, as illustrated in FIG. 23, in the blank time, the touch driving circuit TDC may output the fourth touch electrode driving signal TDS4 of an irregular pulse signal pattern in which the pulse width is not regular to all or some of the plurality of touch electrodes TE.

Here, the fourth touch electrode driving signal TDS4 may be a beacon signal which is transmitted to a pen by the touch display device for pen sensing.

Such a beacon signal is a signal for transmitting information required for pen sensing to the pen and can represent, for example, panel information and pen driving timing information.

Referring to FIG. 24, when it is an active time and the second touch electrode driving signal TDS2 of a DC voltage pattern is output to the plurality of touch electrodes TE (Case 2), the touch driving circuit TDC can receive a pen signal PDS from the pen via the display panel DISP.

The pen signal PDS may be a regular pulse signal with a constant pulse width or may be an irregular pulse signal with an irregular pulse width.

When the touch driving circuit TDC receives the pen signal of a regular pulse signal and outputs sensing data, the touch controller TCR can acquire a position and/or a tilt of the pen using the sensing data.

When the touch driving circuit TDC receives the pen signal PDS of a regular pulse signal and outputs sensing data, the touch controller TCR can acquire various types of additional information of the pen using the sensing data. Here, various types of additional information of the pen can include one or more of a pressure (a pen pressure), a pen ID, button information, battery information, and function information. The additional information of the pen can be represented by pulses of the pen signal PDS.

Figure 25:
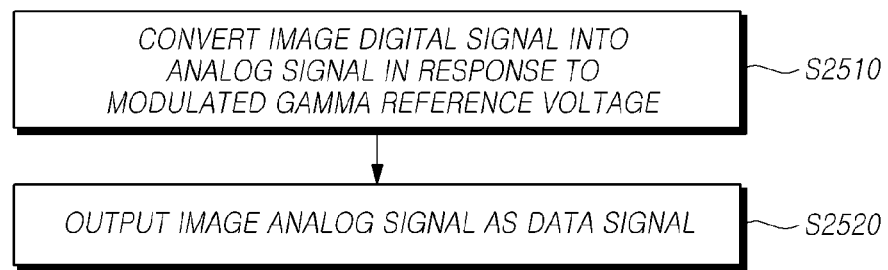
FIG. 25 is a flowchart illustrating a driving method of the touch display device according to the embodiments of the disclosure.

FIG. 25 is a flowchart illustrating a driving method of the touch display device according to the embodiments of the invention.

Referring to FIG. 25, a driving method of the touch display device according to the embodiments of the disclosure includes a step (S2510) of converting an image digital signal into an image analog signal in response to a gamma reference voltage EGBI_M which is modulated in synchronization with a first touch electrode driving signal TDS1 which swings with a first amplitude AMP1 and is applied to the touch electrodes TE arranged in the display panel DISP; and a step (S2520) of outputting a data signal Vdata corresponding to the converted image analog signal to the data lines DL.

The first touch electrode driving signal TDS1 may be a signal which is applied to the touch electrodes TE in an active time.

When the gamma reference voltage EGBI_M is modulated in synchronization with the first touch electrode driving signal TDS1, it means that the gamma reference voltage EGBI_M and the first touch electrode driving signal TDS1 swing at the same frequency and have the same phase.

The gamma reference voltage EGBI_M can have an amplitude corresponding to the first amplitude AMP1 of the first touch electrode driving signal TDS1.

According to the embodiments of the disclosure, it is possible to provide a touch display device, a data driving circuit, and a driving method that can independently perform display and touch sensing.

According to the embodiments of the disclosure, it is possible to provide a touch display device, a data driving circuit, and a driving method that can effectively simultaneously perform display and touch sensing.

According to the embodiments of the disclosure, it is possible to provide a touch display device, a data driving circuit, and a driving method that can simultaneously perform display and touch sensing and achieve excellent display and touch sensing performance by minimizing or removing interference between display driving and touch driving.

According to the embodiments of the disclosure, it is possible to provide a touch display device, a data driving circuit, and a driving method that can operate adaptively to various driving environments.

The above description and the accompanying drawings exemplify the technical idea of the present disclosure, and various modifications and changes such as combination, separation, substitution, and alteration of configurations can be made by those skilled in the art without departing from the essential features of the invention. Accordingly, the embodiments disclosed in the disclosure are not to restrict the technical idea of the invention but to explain the technical idea of the invention. The technical idea of the invention is not limited to the embodiments. The scope of the invention is defined by the appended claims, and all the technical ideas within a range equivalent thereto should be construed as belonging to the scope of the invention.

What is claimed is:

1. A touch display device comprising:
a display panel in which a plurality of data lines, a plurality of gate lines, and a plurality of touch electrodes are arranged; and
a driving circuit configured to output data signals to the plurality of data lines according to a gamma reference voltage,
wherein the gamma reference voltage is a swing signal having a predetermined amplitude during a first period and a direct current (DC) voltage having a constant voltage level during a second period,
wherein, when the gamma reference voltage is the swing signal having the predetermined amplitude during the first period,
the data signals change a voltage level according to the predetermined amplitude of the gamma reference voltage, and a first touch electrode driving signal having a first amplitude corresponding to the predetermined amplitude of the gamma reference voltage is applied to all or some of the plurality of touch electrodes, and
wherein, when the gamma reference voltage is the DC voltage having the constant voltage level during the second period that is different from the first period,
according to the DC voltage of the gamma reference voltage, the data signals are output in a signal form different from a signal form of the data signals during the first period, and a second touch electrode driving signal in the form of a DC voltage signal is applied to all or some of the plurality of touch electrodes.

2. The touch display device according to claim 1, wherein during the second period, a touch electrode to which the second touch electrode driving signal in the form of the DC voltage signal is applied receives a pen signal from a pen.

3. The touch display device according to claim 1, wherein a driving time of the display panel includes active times for frame display and a blank time that exists between the active times, and the first period is included in the active times.

4. The touch display device according to claim 3, wherein a gate signal applied to each of the plurality of gate lines has an on-level gate voltage or an off-level gate voltage, and
wherein each of the on-level gate voltage and the off-level gate voltage has an amplitude corresponding to the first amplitude of the first touch electrode driving signal.

5. The touch display device according to claim 1, wherein a driving time of the display panel includes active times for frame display and a blank time that exists between the active times, and the second period is included in the active times.

6. The touch display device according to claim 5, wherein a gate signal applied to each of the plurality of gate lines has an on-level gate voltage or an off-level gate voltage, and
wherein each of the on-level gate voltage and the off-level gate voltage is a DC voltage having a constant voltage level.

7. The touch display device according to claim 5, wherein during the second period included in the active times, a touch electrode to which the second touch electrode driving signal in the form of the DC voltage signal is applied receives a pen signal from a pen, and
wherein the pen signal includes an irregular pulse signal representing additional information of the pen.

8. The touch display device according to claim 7, wherein during the blank time, a beacon signal, which is an irregular pulse signal, is applied to the plurality of touch electrodes, and the beacon signal is transmitted to the pen through at least one of the plurality of touch electrodes.

9. A driving circuit that drives data lines which are arranged in a display panel, comprising:
- a digital-analog converter configured to receive an image digital signal and a gamma reference voltage, and output an image analog signal according to the gamma reference voltage; and
- an output buffer circuit that outputs a data signal corresponding to the image analog signal to the data lines,
- wherein the gamma reference voltage is a swing signal having a predetermined amplitude during a first period and a direct current (DC) voltage having a constant voltage level during a second period,
- wherein, when the gamma reference voltage is the swing signal having the predetermined amplitude during the first period,
  - the data signals change a voltage level according to the predetermined amplitude of the gamma reference voltage, and a first touch electrode driving signal having a first amplitude corresponding to the predetermined amplitude of the gamma reference voltage is applied to all or some of a plurality of touch electrodes in the display panel, and
- wherein, when the gamma reference voltage is the DC voltage having the constant voltage level during the second period that is different from the first period,
  - according to the DC voltage of the gamma reference voltage, the data signals are output in a signal form different from a signal form of the data signals during the first period, and a second touch electrode driving signal in the form of a DC voltage signal is applied to all or some of the plurality of touch electrodes.

10. The driving circuit according to claim 9, wherein during the second period, a touch electrode to which the second touch electrode driving signal in the form of the DC voltage signal is applied receives a pen signal from a pen.

11. The driving circuit according to claim 9, wherein a driving time of the display panel includes active times for frame display and a blank time that exists between the active times, and the first period is included in the active times.

12. The driving circuit device according to claim 11, wherein a gate signal applied to each of the plurality of gate lines has an on-level gate voltage or an off-level gate voltage, and
- wherein each of the on-level gate voltage and the off-level gate voltage has an amplitude corresponding to the first amplitude of the first touch electrode driving signal.

13. The driving circuit according to claim 9, wherein a driving time of the display panel includes active times for frame display and a blank time that exists between the active times, and the second period is included in the active times.

14. The driving circuit according to claim 13, wherein a gate signal applied to each of the plurality of gate lines has an on-level gate voltage or an off-level gate voltage, and
- wherein each of the on-level gate voltage and the off-level gate voltage is a DC voltage having a constant voltage level.

15. The driving circuit according to claim 13, wherein during the second period included the active times, the touch electrode to which the second touch electrode driving signal in the form of the DC voltage signal is applied receives a pen signal from a pen, and
- wherein the pen signal includes an irregular pulse signal representing additional information of the pen.

16. The driving circuit according to claim 15, wherein during the blank time, a beacon signal, which is an irregular pulse signal, is applied to the plurality of touch electrodes, and the beacon signal is transmitted to the pen through at least one of the plurality of touch electrodes.

* * * * *